(12) United States Patent
Kim et al.

(10) Patent No.: US 11,093,439 B2
(45) Date of Patent: Aug. 17, 2021

(54) PROCESSOR AND CONTROL METHODS THEREOF FOR PERFORMING DEEP LEARNING

(71) Applicant: SAMSUNG ELECTRONICS CO., LTD., Suwon-si (KR)

(72) Inventors: Kyoung-hoon Kim, Suwon-si (KR); Young-hwan Park, Yongin-si (KR); Dong-kwan Suh, Yongin-si (KR); Keshava prasad Nagaraja, Suwon-si (KR); Suk-jin Kim, Seoul (KR); Han-su Cho, Suwon-si (KR); Hyun-jung Kim, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 76 days.

(21) Appl. No.: 16/143,922

(22) Filed: Sep. 27, 2018

(65) Prior Publication Data
US 2019/0129885 A1 May 2, 2019

(30) Foreign Application Priority Data
Oct. 31, 2017 (KR) .................. 10-2017-0143240

(51) Int. Cl.
*G06F 9/30* (2018.01)
*G06N 3/08* (2006.01)
(Continued)

(52) U.S. Cl.
CPC ............ *G06F 15/80* (2013.01); *G06F 7/5443* (2013.01); *G06F 9/30134* (2013.01);
(Continued)

(58) Field of Classification Search
CPC ................................ G06F 15/80; G06N 3/063
See application file for complete search history.

(56) References Cited

U.S. PATENT DOCUMENTS 5,717,832 A * 2/1998 Steimle .............. G06K 9/00986
706/33
8,442,927 B2 5/2013 Chakradhar et al.
(Continued)

FOREIGN PATENT DOCUMENTS

EP 0422348 A2 4/1991
KR 10-1992-0013171 A 7/1992
(Continued)

OTHER PUBLICATIONS

International Search Report dated Jan. 9, 2019 by the International Searching Authority in International Patent Application No. PCT/KR2018/011747. (PCT/ISA/210).
(Continued)

*Primary Examiner* — Michael J Metzger
(74) *Attorney, Agent, or Firm* — Sughrue Mion, PLLC

(57) ABSTRACT

A processor for performing deep learning is provided herein. The processor includes a processing element unit including a plurality of processing elements arranged in a matrix form including a first row of processing elements and a second row of processing elements. The processing elements are fed with filter data by a first data input unit which is connected to the first row processing elements. A second data input unit feeds target data to the processing elements. A shifter composed of registers feeds instructions to the processing elements. A controller in the processor controls the processing elements, the first data input unit and second data input unit to process the filter data and target data, thus providing sum of products (convolution) functionality.

22 Claims, 18 Drawing Sheets

(51) Int. Cl.

| | | |
|---|---|---|
| *G06F 15/80* | (2006.01) | |
| *G06F 7/544* | (2006.01) | |
| *G06N 20/00* | (2019.01) | |
| *G06N 3/04* | (2006.01) | |
| *G06N 3/063* | (2006.01) | |

(52) U.S. Cl.
  CPC .......... *G06N 3/0454* (2013.01); *G06N 3/063* (2013.01); *G06N 3/08* (2013.01); *G06N 20/00* (2019.01)

(56) References Cited

U.S. PATENT DOCUMENTS

| 9,449,257 | B2 | 9/2016 | Shi et al. | |
|---|---|---|---|---|
| 2008/0059762 | A1 | 3/2008 | Mitu et al. | |
| 2014/0180989 | A1 | 6/2014 | Krizhevsky et al. | |
| 2016/0196488 | A1 | 7/2016 | Ahn | |
| 2016/0306772 | A1* | 10/2016 | Burger ................ | G06F 9/5077 |
| 2016/0342568 | A1* | 11/2016 | Burchard ............. | G06F 9/5072 |
| 2016/0342889 | A1 | 11/2016 | Thorson et al. | |
| 2016/0342890 | A1 | 11/2016 | Young | |
| 2016/0364644 | A1 | 12/2016 | Brothers et al. | |
| 2017/0103310 | A1 | 4/2017 | Henry et al. | |
| 2017/0103313 | A1 | 4/2017 | Ross et al. | |
| 2017/0103316 | A1 | 4/2017 | Ross et al. | |
| 2017/0148430 | A1 | 5/2017 | Lee | |
| 2017/0235515 | A1 | 8/2017 | Lea et al. | |
| 2017/0277658 | A1 | 9/2017 | Pratas et al. | |
| 2018/0007303 | A1* | 1/2018 | Meixner ................ | H04N 5/341 |
| 2018/0032336 | A1* | 2/2018 | Qi ........................ | G06F 9/3881 |
| 2018/0101763 | A1* | 4/2018 | Barnard .............. | G06F 12/0207 |
| 2018/0113840 | A1* | 4/2018 | Li ........................... | G06F 15/80 |
| 2018/0307438 | A1* | 10/2018 | Huang .................. | G06F 3/0656 |
| 2019/0114499 | A1* | 4/2019 | Delaye .................. | G06F 17/153 |

FOREIGN PATENT DOCUMENTS

| KR | 10-0956747 B1 | 5/2010 |
|---|---|---|
| KR | 10-2011-0037183 A | 4/2011 |
| WO | 2015/016640 A1 | 2/2015 |

OTHER PUBLICATIONS

Written Opinion dated Jan. 9, 2019 by the International Searching Authority in International Patent Application No. PCT/KR2018/011747. (PCT/ISA/237).

Norman P. Jouppi et al. "In-Datacenter Performance Analysis of a Tensor Processing Unit" ISCA, vol. 17, Jun. 24-28, 2017 (pp. 1-12).

Yu-Hsin Chen et al. "Eyeriss: An Energy-Efficient Reconfigurable Accelerator for Deep Convolutional Neural Networks" ISSCC 2016, IEEE International Solid-State Circuits Conference, Jan. 31-Feb. 4, 2016. San Francisco, CA. (4 pages total).

Jorge Albericio et al. "Cnvlutin: Ineffectual-Neuron-Free Deep Neural Network Computing" (13 pages total).

Zidong Du et al. "ShiDianNao: Shifting Vision Processing Closer to the Sensor" ISCA ' 15, Jun. 13-17, 2015 (pp. 92-104).

Communication dated Apr. 29, 2020 by the European Patent Office in counterpart European Patent Application No. 18873840.5.

Communication dated Feb. 4, 2021 issued by the European Patent Office in European Application No. 18873840.5.

* cited by examiner

PROCESSOR AND CONTROL METHODS THEREOF FOR PERFORMING DEEP LEARNING

CROSS-REFERENCE TO RELATED APPLICATIONS

This application is based on and claims priority under 35 U.S.C. § 119 to Korean Patent Application No. 10-2017-0143240, filed in the Korean Intellectual Property Office on Oct. 31, 2017, the disclosure of which is incorporated by reference herein in its entirety.

BACKGROUND

1. Field

Aspects of the example embodiments relate generally to a processor and a control method thereof and, more particularly to, a processor for performing deep learning and a control method thereof.

2. Description of Related Art

Machine learning is a field of artificial intelligence, which means a technology of generating new knowledge by inputting data to a computer and making a computer learn the input data. In particular, the field of artificial neural network, which is one of the machine learning technologies, exhibits remarkable progress, resulting in the birth of deep learning. Deep learning is a kind of machine learning technology based on artificial neural networks. Even if the artificial neural network is designed and deepened in a multi-layered structure, the network can improve learning efficiency by preprocessing learning data for unsupervised learning. In particular, deep learning has been advanced recently due to the improvement of big data associated with the Internet and the computing ability to handle the big data.

Also, in order to improve the computing ability for processing big data, it is possible to implement a deep neural network (DNN) having a plurality of neural networks using a plurality of processors. At this time, the scalability of each processor in DNN implementation may be a very important factor. The scalability of the processor will be described with reference to FIGS. 1A to 1D.

FIG. 1A is a view which briefly illustrates a structure of a related art processor. A processor includes a plurality of processing elements, and data sharing is available among neighboring processing elements.

Each of the processing elements basically includes a multiplier and an arithmetic logic unit (ALU), and the ALU may include at least one adder. The processing elements can perform arithmetic operations using a multiplier and ALU.

An external memory can be divided into a plurality of memory banks and can provide data to each of a plurality of processing elements.

FIG. 1B is a view to describe convolution processing using a structure of a related art processor.

The convolution processing is processing for transforming image data using kernel data. The kernel data may also be referred to as filter data. The image data may also be referred to as target data. A convolution over sampled data can generally be represented as a sum of products. For filter weights or elements {a, b, c, d, e, f, g, h, and i} and target data words represented with placeholders {"1" "2." "3." "4," "5," "6," "7," "8." "9"}, the sum of products may be represented as (the multiplication operator is implied by juxtaposition) as a1+b2+c3+d4+e5+f6+g7+h8+i9. For example, the convolution processing using kernel data for nine pixels on the upper left of the image is as follows:

a1+b2+c3+d4+e5+f6+g7+h8+i9

One pixel data of accumulation can be calculated through the above processing. When the kernel data is moved on a pixel-by-pixel basis and the above processing is performed on the entire image data, the accumulation is completed (the pixels outside the accumulation are derived through separate calculation, and a detailed description thereof will be omitted).

The processor performs processing for a plurality of cycles to perform the convolution processing. First, a part of the image data in the first cycle can be inputted to a plurality of processing elements. For example, since a plurality of processing elements are 16, 1 to 9 of image data and seven pixel data adjacent thereto can be input to a plurality of processing elements. Also, a of the kernel data can be input to a plurality of processing elements. A processing instruction can be input to a plurality of processing elements. A plurality of processing elements can process a and respective pixel data based on the input processing instruction. The processing result is moved to the adjacent processing element. In FIG. 1B, it is illustrated that a and a processing instruction from among kernel data are input to some processing elements. However, this is to prevent the drawing from being complicated. Actually, among the kernel data, a and the processing instruction can be input to all processing elements.

In the second cycle, the image data is used as it is, and b and processing instructions in the kernel data can be input into a plurality of processing elements. The plurality of processing elements can process b and each pixel data, based on the inputted processing instruction and accumulate with the processing result of the first cycle.

A processing similar to the second cycle is repeated until the ninth cycle which is the number of kernel data, so that a part of the pixel data of the accumulation can be calculated.

Considering the amount of data movement during each cycle in the above processing, 16 pieces of pixel data are moved from the image data stored in the external memory to a plurality of processing elements in the first cycle, but from the second cycle to the ninth cycle, there is no image data movement from the external memory to the processor. That is, the data movement amount can be expressed as shown in FIG. 1C. In FIG. 1C, the ordinate is marked "Datapath Activity" and the x-axis is marked "Time." On the time axis, a first clock cycle, a second clock cycle and a third clock cycle are indicated. The datapath activity is very bursty in the related art. That is, a data path from the external memory to the processor needs to be formed so as to at least allow data input to a plurality of processing elements at the same time.

If DNN is implemented using a plurality of processors, it can be expressed as shown in FIG. 1D, and the data path between the processor and the external memory may increase exponentially. Here, each 2D array represents a processor. That is, when using a conventional processor, it seems difficult to realize DNN through simple parallel connection.

Accordingly, there is a necessity to develop a process which considers scalability.

SUMMARY

An aspect of the example embodiments relates to an image content providing method and an image providing apparatus which is to provide a processor for reducing peak data from an external memory and a control method thereof.

According to an embodiment of the present disclosure, there is provided a processor performing deep learning. The processor includes a processing element unit including a plurality of processing elements arranged in a matrix form; a first data input unit which is connected to each of a plurality of first processing elements included in a first row of the processing element unit; a second data input unit connected to each of the plurality of processing elements of the processing element unit; and a shifter including a plurality of register units corresponding to each of a plurality of rows of the processing element unit, wherein each of the plurality of register units is connected to a plurality of processing elements included in a corresponding row of the processing element unit, wherein the processor may control the processing element unit to process data which is input through the first data input unit and data which is input through the second data input unit based on a processing instruction which is input through the shifter.

The processor may, in a second cycle following the first cycle, control the processing element unit to shift the first element into each of the plurality of second processing elements included in the second row of the processing element unit, control the first data input unit to input a second element out of the plurality of elements included in the filter to each of the plurality of first processing elements, and control the processing element unit to process the second element and the first data based on the second processing instruction which is input through the shifter.

The processor may, in a second cycle following the first cycle, control the processing element unit to shift the first element to each of a plurality of second processing elements included in a second row of the processing element unit, control the second data input unit to input second data from among the target data to each of the plurality of second processing elements, and control the processing element unit to process the first element and the second data shifted from the first row based on the first processing instruction inputted through the shifter.

The processor may, in a second cycle following the first cycle, control the processing element unit to shift the first element to each of a plurality of second processing elements included in a second row of the processing element unit, control the second data input unit to input second data from among the target data to each of the plurality of second processing elements, and control the processing element unit to process the first element shifted from the first row and the second data based on the first processing instruction inputted through the shifter.

The processor may, in the first cycle, control the shifter to input the first processing instruction to each of the plurality of first processing elements and control the shifter to shift the first processing instruction from a first register unit corresponding to the first row to a second register unit corresponding to the second row, and in the second cycle, control the shifter to input the shifted first processing instruction to each of the plurality of second processing elements, input the second processing instruction to each of the plurality of first processing elements, control the shifter to shift the first processing instruction from the second register unit to a third register unit corresponding to a third row of the processing element unit, and shift the second processing instruction from the first register unit to the second register unit.

The processor may transfer processing data obtained by processing the first element and the first data to an adjacent element and control the processing element unit to accumulate the transferred processing data with the data processed in the processing element.

The second data input unit is connectable to the external memory through data paths in the same number as a plurality of processing elements included in a row of the processing element unit.

The processor further includes a processing instruction register unit; and a multiplexer connected between the processing instruction register unit and the shifter, and the processor may control the multiplexer to provide one of the plurality of processing instruction sets stored in the processing instruction register unit, wherein each of the each of the plurality of processing instruction sets may include a plurality of processing instructions to be input to each of a plurality of rows of arithmetic processing element units.

The processor may store the processing instruction set which is input to the shifter in a plurality of register units, shift each of the instructions included in the stored processing instruction set to an adjacent register unit in a predetermined direction, input an additional processing instruction to the first register unit corresponding to the first row, and control the shifter to input the additional processing instruction and each of the instructions included in the additional processing instruction and instructions included in the shifted processing instruction set can be input to each of the rows corresponding to the processing element unit.

The processor may control the shifter to provide an additional processing instruction and an instruction included in the shifted processing instruction set to the processing instruction register unit, and update the processing instruction set which is input to the shifter from among the plurality of processing instruction set included in the processing instruction register unit to an additional processing instruction and an instruction included in the shifted processing instruction set.

According to an exemplary embodiment, the processor includes a processing element unit including a plurality of processing elements arranged in a matrix form; a first data input unit which is connected to each of a plurality of first processing elements included in a first row of the processing element unit; a second data input unit connected to each of the plurality of processing elements of the processing element unit; and a shifter including a plurality of register units corresponding to each of a plurality of rows of the processing element unit, wherein each of the plurality of register units is connected to a plurality of processing elements included in a corresponding row of the processing element unit, and a control method of a processor performing deep learning includes inputting a processing instruction to the processing element unit through the shifter, inputting data to the processing element unit through the first data input unit, and inputting data to the processing element unit through the second data input unit; and processing, by the processing element unit, data which is input through the first data input unit and data which is input through the second data input unit based on the processing instruction.

The processing may include, in a first cycle, inputting a first element from among a plurality of elements included in a filter to each of the plurality of first processing elements, inputting first data from among a target data to each of the plurality of first processing elements, and processing by the processing element unit the first element and the first data based on a first processing instruction which is input through the shifter.

The processing may further include, in a second cycle following the first cycle, shifting the first element into each of a plurality of second processing elements included in a second row of the processing element unit, inputting a second element from among the plurality of elements included in the filter to each of the plurality of first processing elements, and processing the second element and the first data based on the second processing instruction which is input through the shifter.

The processing may further include in a second cycle following the first cycle, shifting the first element to each of a plurality of second processing elements included in a second row of the processing element unit, inputting second data from among the target data to each of the plurality of second processing elements, and processing the first element shifted from the first row and the second data based on the first processing instruction inputted through the shifter.

The processing may further include, in the first cycle, inputting the first processing instruction to each of the plurality of first processing elements and shifting the first processing instruction from a first register unit corresponding to the first row to a second register unit corresponding to the second row, and in the second cycle, inputting the shifted first processing instruction to each of the plurality of second processing elements, inputting the second processing instruction to each of the plurality of first processing elements, shifting the first processing instruction from the second register unit to a third register unit corresponding to a third row of the processing element unit, and shifting the second processing instruction from the first register unit to the second register unit.

The processing may further include transferring processing data obtained by processing the first element and the first data to an adjacent element and accumulating the transferred processing data with the data processed in the processing element.

The second data input unit is connectable to the external memory through data paths in the same number as a plurality of processing elements included in a row of the processing element unit.

The processor further includes a processing instruction register unit; and a multiplexer connected between the processing instruction register unit and the shifter, and the control method further includes providing one of the plurality of processing instruction sets stored in the processing instruction register unit, wherein each of the each of the plurality of processing instruction sets includes a plurality of processing instructions to be input to each of a plurality of rows of arithmetic processing element units.

The method further includes storing the processing instruction set which is input to the shifter in a plurality of register units; shifting each of the instructions included in the stored processing instruction set to an adjacent register unit in a predetermined direction; and inputting an additional processing instruction to the first register unit corresponding to the first row, wherein the inputting the processing instruction to the processing element unit may include inputting the additional processing instruction and each of the instructions included in the additional processing instruction and instructions included in the shifted processing instruction set to each of the rows corresponding to the processing element unit.

The method may further include providing an additional processing instruction and an instruction included in the shifted processing instruction set to the processing instruction register unit, and updating the processing instruction set which is input to the shifter from among the plurality of processing instruction set included in the processing instruction register unit to an additional processing instruction and an instruction included in the shifted processing instruction set.

In an additional embodiment provided herein, a processor for performing deep learning is disclosed. The processor includes a controller; a processing element array including a plurality of processing elements, wherein: i) the plurality of processing elements comprise first processing elements, ii) the plurality of processing elements are arranged in a matrix of a number of rows and a number of columns, iii) a first row of the processing element array includes the first processing elements, iv) a second row of the processing element array includes second processing elements and v) the first processing elements include a first processing element followed by a second processing element; a first data input interface connected to each processing element of the first processing elements, wherein the first data input interface is configured to input filter data to the first processing elements; a second data input interface connected to each processing element of the processing element array, wherein the second data input interface is configured to input target data to the processing element array; and a shifter including a plurality of registers, wherein: i) a first register of the plurality of registers is connected to the first row, ii) a second register of the plurality of registers is connected to the second row, and iii) the shifter is configured to input a plurality of processing instructions to the processing element array, wherein the plurality of processing instructions includes a first processing instruction.

In some embodiments of the additional embodiment, for a first cycle, the controller is further configured to: control the first data input interface to input a first element of the filter data to each of the first processing elements, control the second data input interface to: input a first target word of the target data to a first processing element of the first processing elements, and input a second target word of the target data to a second processing element of the first processing elements, and control the processing element array to: form a first result based on the first element, the first target word, and the first processing instruction, and form a second result based on the first element, the second target word, and the first processing instruction.

In some embodiments of the additional embodiment, for a second cycle following the first cycle, the controller is further configured to: control the processing element array to shift the first element of the filter data into the second processing elements, control the first data input interface to input a second element of the filter data to each of the first processing elements, and control the processing element array to process the second element and the target data based on a second processing instruction.

Also, in some embodiments of the additional embodiment, for a second cycle following the first cycle, the controller is further configured to: control the processing element array to shift the first element of the filter data second processing elements, wherein a second row of the matrix includes the second processing elements, control the second data input interface to input a third target word of the target data to a first processing element of the second processing elements, and control the processing element array to process the first element and the third target word based on the first processing instruction.

In addition, in some embodiments of the additional embodiment the controller is further configured to control the shifter, for the first cycle, to: input the first processing instruction to the first processing elements, and shift the first processing instruction from the first register to the second register; and control the shifter, for the second cycle, to: input the first processing instruction from the second register to each of the second processing elements, input a second processing instruction from the first register to each of the first processing elements, shift the first processing instruction from the second register to a third register associated with a third row of the processing element array, and shift the second processing instruction from the first register to the second register.

Also, in some embodiments of the additional embodiment the controller is further configured to: control the first processing element of the first processing elements to: transfer the first result to the second processing element of the first processing elements, wherein the second processing element of the first processing elements is adjacent to the first processing element of the first processing elements, and control the second processing element to accumulate the first result with other data previously processed in the second processing element.

In addition, in some embodiments of the additional embodiment the second data input interface is connectable to an external memory through data paths, wherein a number of the data paths is the number of columns.

Also, in some embodiments of the additional embodiment the processor includes a processing instruction register file; and a multiplexer connected between the processing instruction register file and the shifter, wherein the controller is further configured to control the multiplexer to provide to the shifter a first processing instruction set obtained from the processing instruction register file, and wherein the first processing instruction set includes the first processing instruction.

In addition, in some embodiments of the additional embodiment the processor includes a processing element instruction memory configured to store the first processing instruction set, and the controller is further configured to control the shifter to: shift the first processing instruction set downward to make room in the first register, input, from the processing element instruction memory, an additional processing instruction to a position in the processing instruction register file associated with the first row, and input the additional processing instruction and second additional processing instructions of the first processing instruction set to rows of the processing element array.

In some embodiments of the additional embodiment the controller is further configured to: control the processing instruction register file to input, from the processing element instruction memory to the processing instruction register file, a second processing instruction set for a pooling operation with respect to the first processing instruction set, and control the shifter to input the second processing instruction set.

Also, this disclosure provides an additional control method of a processor performing deep learning, wherein the processor includes a controller, a processing element array in a matrix form with a number of rows and a number of columns, a first data input interface, a second data input interface, and a shifter, the control method including inputting a first processing instruction to first processing elements of a first row of the processing element array through the shifter, inputting filter data to the first processing elements through the first data input interface, and inputting first target data to the first processing elements through the second data input interface; and processing, by the processing element array, the filter data and the first target data based on the first processing instruction.

In some embodiments of the additional control method the processing, in a first cycle, further includes inputting a first element from the filter data to each of the first processing elements, inputting the first target data to each of the first processing elements, and processing by the processing element array the first element and the first target data based on the first processing instruction.

In some embodiments of the additional control method in a second cycle following the first cycle, further includes inputting a second processing instruction to second processing elements of a second row of the processing element array through the shifter; shifting the first element into the second processing elements included in a second row of the processing element array; inputting a second element from the filter data to each of the first processing elements; and processing the second element and the first target data based on the second processing instruction.

In some embodiments of the additional control method in a second cycle following the first cycle, the processing further includes shifting the first element to second processing elements of a second row of the processing element array; inputting second target data to each of the second processing elements; and processing the first element and the second target data based on the first processing instruction.

Also, in some embodiments of the additional control method the processing further includes in the first cycle, inputting the first processing instruction to each of the first processing elements and shifting the first processing instruction from a first register corresponding to the first row to a second register corresponding to the second row, and in the second cycle, inputting the first processing instruction to each of the second processing elements, inputting a second processing instruction to each of the first processing elements, shifting the first processing instruction from the second register to a third register corresponding to a third row of the processing element array, and shifting the second processing instruction from the first register to the second register.

In some embodiments of the additional control method the processing further includes transferring processing data obtained by processing the first element and the first target data to an adjacent processing element; and accumulating the transferred processing data with other data previously processed in the adjacent processing element.

Also, in some embodiments of the additional control method the second data input interface is connectable to an external memory through data paths, wherein a number of data paths is a number of columns the processing element array.

In some embodiments of the additional control method the processor further includes: i) a processing instruction register file; and ii) a multiplexer connected between the processing instruction register file and the shifter, and the control method further includes providing one of a plurality of processing instruction sets stored in the processing instruction register file to the shifter, wherein each of the plurality of processing instruction sets includes a plurality of processing instructions to be input to rows of the processing element array.

Also, in some embodiments of the additional control method further includes storing a first processing instruction set in a plurality of registers of the shifter; shifting instructions of the first processing instruction set downward to make room for an additional processing instruction; inputting the additional processing instruction to a first register corresponding to the first row; and inputting the additional processing instruction and the additional processing instructions of the first processing instruction set to rows of the processing element array.

In some embodiments of the additional control method further includes controlling the processing instruction register file to input, from a processing element instruction memory to the processing instruction register file, a second processing instruction set for a pooling operation with respect to the first processing instruction set, and controlling the shifter to input the second processing instruction set.

According to various embodiments of the present invention as described above, it is possible to improve the scalability of the processor by designing the processor to reduce the amount of peak data movement from the external memory.

BRIEF DESCRIPTION OF THE DRAWINGS

The above and/or other aspects of the present disclosure will be more apparent from the following detailed description, taken in conjunction with the accompanying drawings, in which like reference numerals refer to like elements, and wherein.

DETAILED DESCRIPTION

Figure 1A:
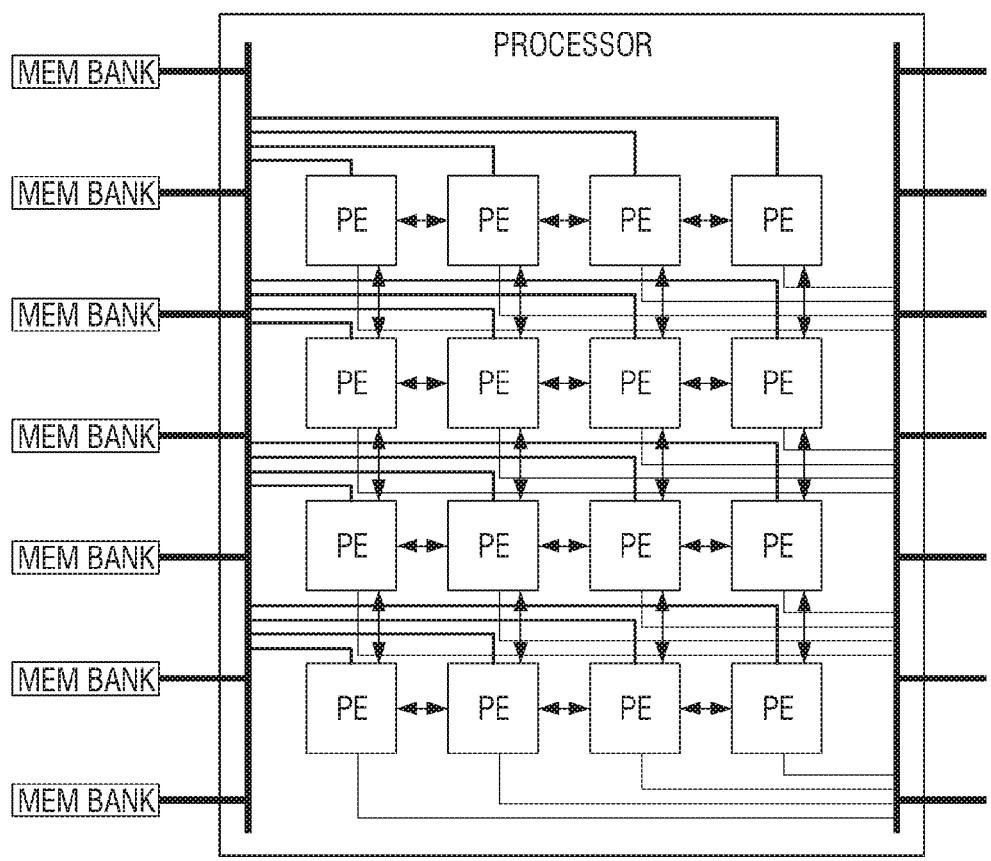
FIGS. 1A to 1D are views to describe problems of related art.

The exemplary embodiments of the present disclosure may be diversely modified. Accordingly, specific exemplary embodiments are illustrated in the drawings and are described in detail in the detailed description. However, it is to be understood that the present disclosure is not limited to a specific exemplary embodiment, but includes all modifications, equivalents, and substitutions without departing from the scope and spirit of the present disclosure. Also, well-known functions or constructions are not described in detail since they would obscure the disclosure with unnecessary detail.

Certain example embodiments are described in greater detail below with reference to the accompanying drawings.

Figure 2A:
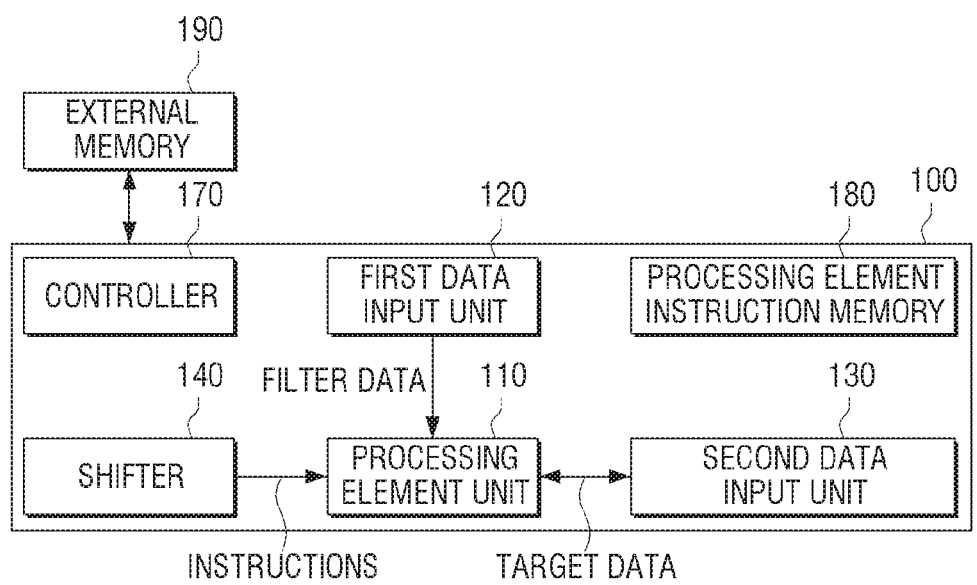
FIG. 2A is a block diagram illustrating a processor which performs deep learning according to an exemplary embodiment.

FIG. 2A is a block diagram illustrating a processor 100 which performs deep learning according to an exemplary embodiment.

As illustrated in FIG. 2A, the processor 100 includes a processing element unit 110, a first data input unit 120, a second data input unit 130, and a shifter 140. In some embodiments, the processing element unit 110 is realized by a processing element array, the first data input unit 120 is realized by a first data input interface, and the second data input unit 130 is realized by a second data input interface. The processor 100, in some embodiments, includes a controller 170 and a processing element instruction memory 180. The processor 100, in some embodiments, is configured to communicate with an external memory, 190.

The controller 170 in some embodiments, is a custom hardware circuit. In some embodiments, the controller 170 is one or more microprocessors configured to execute program code stored in one or more program code memories (not shown). In some embodiments, the program code memories are internal to the processor 100.

The processing element unit 110 may include a plurality of processing elements arranged in a matrix form. A matrix includes a number of rows, and the number of processing elements in one row is equal to the number of columns of the matrix. Unidirectional shift or bidirectional shift of data is possible between adjacent processing elements.

Each of the processing elements basically includes a multiplier and an arithmetic logic unit (ALU), and the ALU may include at least one adder. The processing element can perform arithmetic operations using a multiplier and the ALU. However, the present disclosure is not limited thereto, and any other structure may be used as long as functions such as arithmetic operation and shift can be performed.

Each of the processing elements may include a register for storing data. For example, each of the processing elements may include a register for storing the result of the processing in a particular cycle. Alternatively, each of the processing elements may include a register for shifting the result of the processing in a particular cycle to an adjacent processing element and storing the result of the shifting operation from the adjacent processing element.

The first data input unit 120 may be connected to each of the plurality of first processing elements included in the first row of the processing element unit 110. Here, the first row of the processing element unit 110 may be one of the two outermost rows of processing element units.

The first data input unit 120 may receive the filter (kernel) data and input the same to each of the plurality of first processing elements included in the first row of the processing element unit 110. For example, the first data input unit 120 may receive a, b, c, and d filter data and input a in each of the plurality of first calculation elements in the first cycle. Then, the first data input unit 120 may input b in each of the plurality of first processing elements in the second cycle, and sequentially input c and d into the plurality of first processing elements when the cycle is changed. In the meantime, the filter data is one of the input data used in the convolution processing, and the use thereof is the same as that of the kernel data. Therefore, the filter data can be interchangeably used with the kernel data.

For example, one register unit may store only one of the kernel data a, b, c, and d. In some embodiments, a register unit is realized by a register. The first data input unit 120 may be implemented as a plurality of register units for storing the entire kernel data. Herein, one of the register units may store one of a plurality of elements included in the kernel data. For example, one register unit may store one of the kernel data a, b, c, and d.

The first data input unit 120 may further include a multiplexer for inputting only the elements required for each cycle among the entire filter (kernel) data into each of the plurality of first processing elements. For example, the multiplexer may receive filter (kernel) data of a, b, c, and d from a plurality of register units and provide only one of them to the processing element unit 110.

Alternatively, the first data input unit 120 may include a register unit that stores only the elements required for each cycle of the entire kernel data. In this case, the first data input unit 120 can input the data stored in the register unit to each of the plurality of first processing elements.

Alternatively, the first data input unit 120 may include only a multiplexer that receives the entire kernel data directly from the external memory, and provides only one of them to each of the plurality of first processing elements.

The internal structure of the first data input unit 120 described so far is merely exemplary and can be embodied as another type.

As the first data input unit 120 is connected only to each of the plurality of first processing elements included in the first row of the processing element unit 110, the data path can be reduced compared with the conventional data path. For example, when the processor 100 includes a plurality of computing elements of the 5×5 format, according to the related art of FIG. 1B, 25 data paths are required so that one element of the filter (kernel) data is input to a total of 25 processing elements. In contrast, as for the present disclosure, as the first data input unit 120 is connected to each of the plurality of first processing elements and thus, only five data paths are required. Accordingly, the hardware design can be facilitated, the degree of integration can be improved, and the scalability of the processor 100 can be improved.

The second data input unit 130 may be connected to each of the plurality of processing elements of the processing element unit 110. However, the second data input unit 130 may receive the target data, and may input a part of the target data in units of rows of the processing element unit 110 for each cycle.

Accordingly, the second data input unit 130 may be connected to the external memory through the same number of data paths as the number of plurality of processing elements included in the row of the processing element unit 110. The present disclosure is not limited thereto, and the number of data paths formed between the second data input unit 130 and the external memory may be equal to or greater than the number of the plurality of processing elements included in the row of the processing element unit 110.

The second data input unit 130 may include a register unit that stores only a part of target data to be input to the processing element unit 110 for each cycle. For example, the second data input unit 130 may store target data to be input to a plurality of processing elements included in the row of processing element unit 110. When the cycle is changed (one processing cycle ends and another begins), the second data input unit 130 may input the stored target data to the processing element unit 110 and receive new target data from the external memory. At this time, the processor 100 may read data necessary for each cycle from the external memory and control the external memory to be input to the second data input unit 130.

The second data input unit 130 may further include a demultiplexer for inputting a part of the target data stored in the register unit to one of a plurality of rows of the processing element unit 110.

Alternatively, the second data input unit 130 may include only a demultiplexer for inputting a part of the target data from the external memory on a cycle-by-cycle basis and inputting the input data to one of a plurality of rows of the processing element unit 110.

The internal structure of the second data input unit 130 described above is only one embodiment and may be implemented in any other form.

The second data input unit 130 can receive only a part of the target data to be inputted to the processing element unit 110 from the external memory. That is, since the second data input unit 130 does not input the target data to the processing element unit 110 at a time, but inputs a part of data by each cycle, the data path connected to the external memory can be reduced as compared with the related prior art. For example, if the processor 100 includes a plurality of processing elements in a 5×5 form, the second data input unit 130 according to the related art of FIG. 1B may have to receive target data from the external memory through at least 25 data paths. Regarding the foregoing, the second data input unit 130 of the present disclosure receives only a part of the target data from the external memory by at least five data paths on a cycle-by-cycle basis. Accordingly, the hardware design can be facilitated, the degree of integration can be improved, and the scalability of the processor 100 can be improved.

The shifter 140 includes a plurality of register units corresponding to each of a plurality of rows of processing element units 110. Each of the plurality of register units may be connected to a plurality of processing elements included in the row of the corresponding processing element unit 110. Here, one register unit may store one processing instruction.

The processor 100 may control the processing element unit 110 to process data which is input through the first data input unit 120 and the data which is input through the second data input unit 130 based on a processing instruction that is input through the shifter 140.

For example, the processor 100 may further include a clock generation unit (not shown) for generating a clock therein. The clock generation unit may transmit generated clocks generated to each unit in the processor 100, and each unit in the processor 100 may process data based on the input clock. For example, the first data input unit 120 and the second data input unit 130 input data stored in response to the rising edge of the clock to the processing element unit 110 and receive data from the external memory. The processing element unit 110 can process the input data in response to the rising edge of the clock. The shifter 140 may input the processing instruction to the processing element unit 110 in response to the rising edge of the clock and shift the processing instruction to the adjacent register unit. Alternatively, each unit within the processor 100 may be responsive to a falling edge of the clock and to both rising and falling edges. Generally, data flow through the processor is performed based on clocking operations. The clocking operations are sufficient to avoid race conditions. Since the internal synchronization operation of the processor 100 is the related-art technology, a detailed description thereof will be omitted.

Alternatively, the processor 100 may be implemented in an asynchronous manner. For example, the processor 100 may include a separate controller, and the controller may directly transmit a control instruction to each unit at a point in time when each unit in the processor 100 should operate.

Figure 2B:
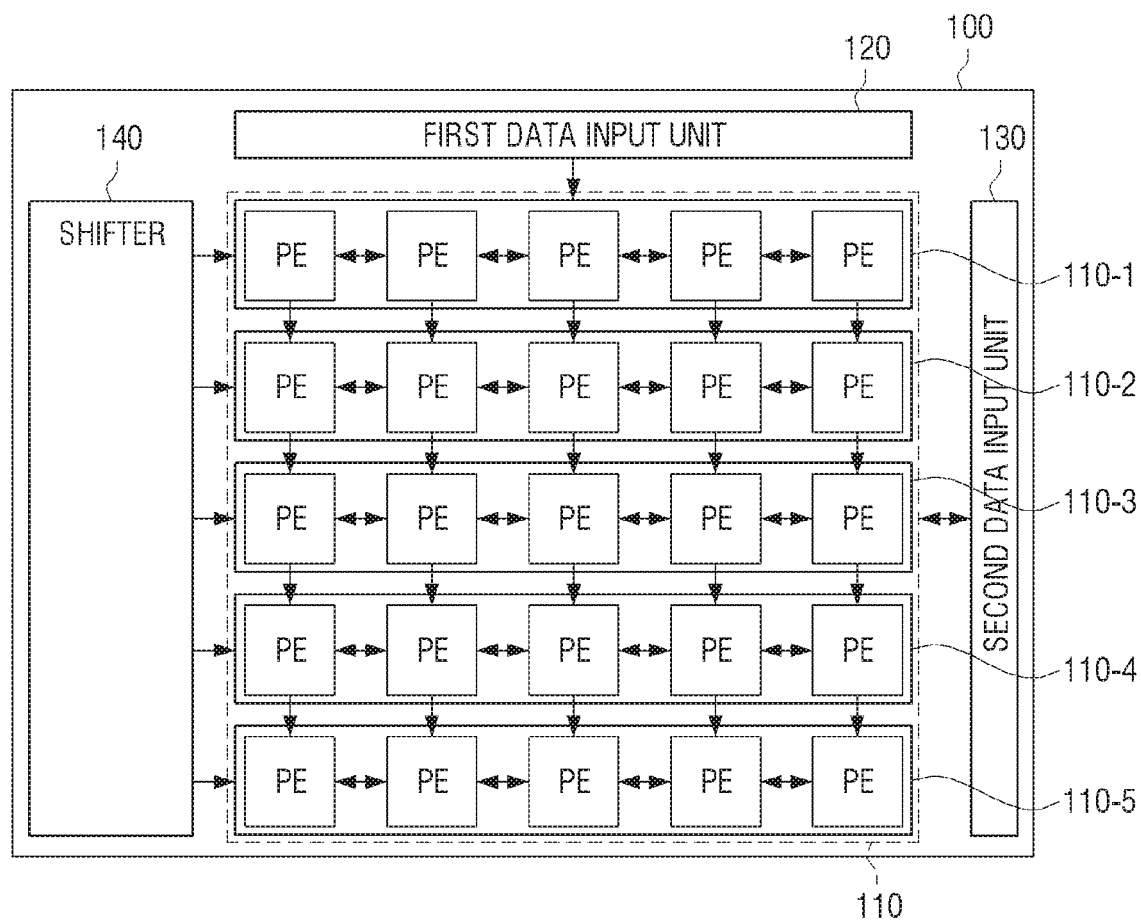
FIG. 2B is a block diagram illustrating a detailed configuration of a processing element unit in a processor for performing deep learning according to an exemplary embodiment.

FIG. 2B is a block diagram illustrating a detailed configuration of a processing element unit 110 in a processor 100 for performing deep learning according to an exemplary embodiment. Although the processing element unit 110 in FIG. 2B is illustrated as including 25 processing elements, this is only an example and may be constructed of any number of processing elements.

The processing element unit 110 can be divided into five rows. That is, the processing element unit 110 includes a plurality of first processing elements 110-1 included in the first row, a plurality of second processing elements 110-2 included in the second row, a plurality of third processing elements 110-3 included in the third row, a plurality of fourth processing elements 110-4 included in the fourth row, and a plurality of fifth processing elements 110-5 included in the fifth row.

Bidirectional shift of data is possible between adjacent processing elements in the same row. Only one-way shift of data is possible between adjacent computing elements that are not in the same row. That is, data can be shifted only in the direction from the first row to the fifth row between adjacent processing elements that are not in the same row. Here, the adjacent processing elements mean processing elements arranged on the upper, lower, left, and right sides with reference to a specific processing element. "Adjacent" does not refer to a neighboring processing element arranged on a diagonal line.

The first data input unit 120 may be connected to each of the plurality of first processing elements 110-1. That is, the first data input unit 120 is connected to each of the five processing elements included in the first row, and one of the plurality of elements included in the filter (kernel) data can be input to all five processing elements. That is, during one cycle, the first data input unit 120 can input the same data to the plurality of first processing elements 110-1.

However, this is merely exemplary, and the first data input unit 120 may input different data to each of the plurality of first processing elements 110-1 for one cycle. That is, the above example is for describing the case of the convolution processing, and may be performed differently when the processor 100 performs another processing. Also, even in the case of the convolution processing, the processing order may be changed so that the first data input unit 120 may input different data to each of the plurality of first processing elements 110-1 for one cycle.

The second data input unit 130 may be connected to each of the plurality of processing elements of the processing element unit 110. In the first cycle, the second data input unit 130 can input a part of the target data to each of the plurality of first processing elements 110-1. At this time, data input to each of the plurality of first processing elements 110-1 may be different from each other. In the second cycle, the second data input unit 130 can input another part of the target data to each of the plurality of second processing elements 110-2.

The plurality of register units included in the shifter 140 may be connected to each of the plurality of rows of the processing element unit 110, respectively. For example, the first register unit may be coupled to a plurality of first processing elements 110-1, the second register unit may be coupled to a plurality of second processing elements 110-2, the third register unit may be coupled to a plurality of third processing elements 110-3, the fourth register unit is connected to the plurality of fourth processing elements 110-4 and the fifth register unit is connected to the plurality of fifth processing elements 110-5. Each register unit can input the same processing instruction to the connected processing element. For example, the first register unit may input one processing instruction to the plurality of first processing elements 110-1.

Figure 1B:
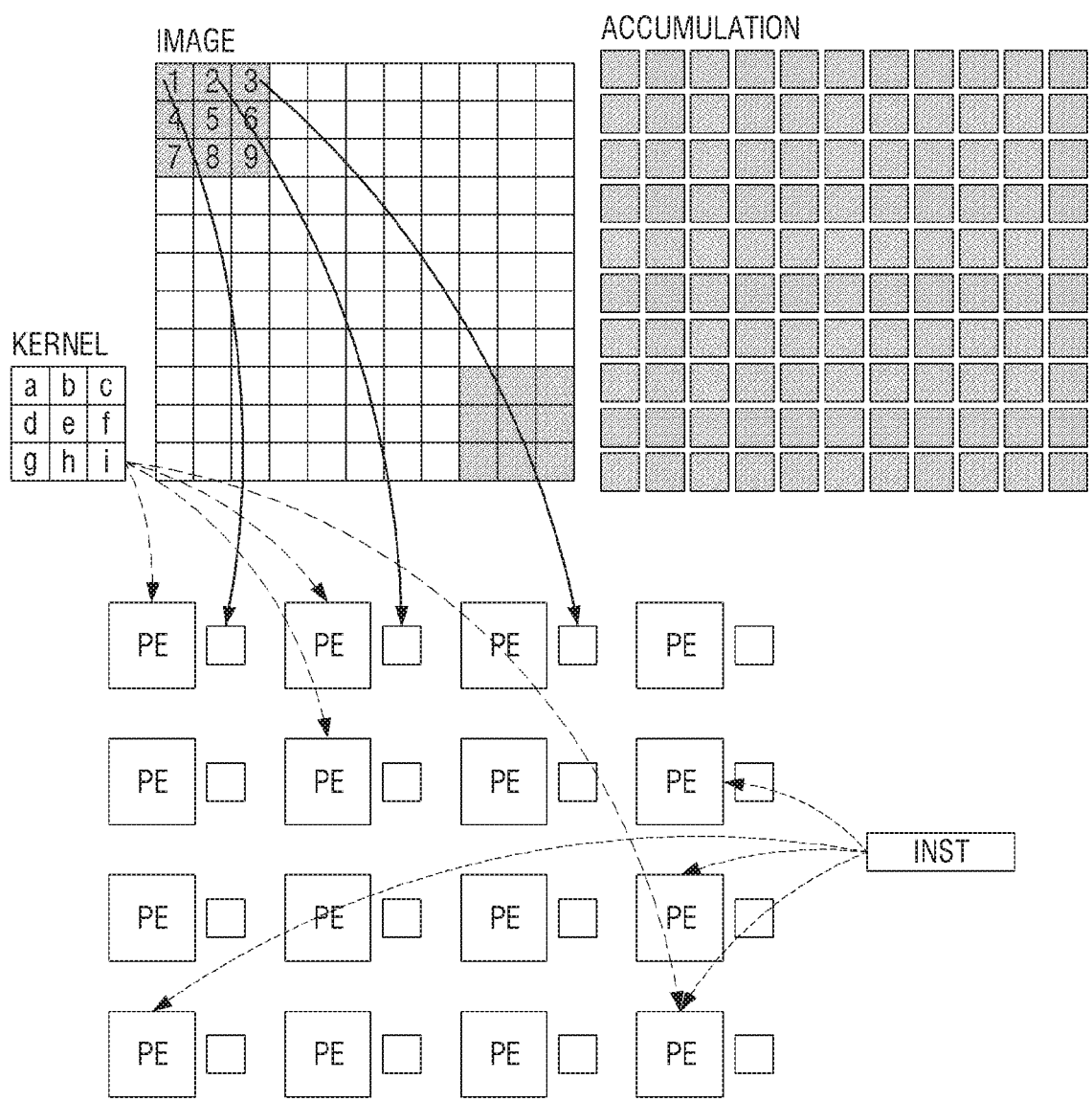

Meanwhile, according to the related art of FIG. 1B, a processing instruction needs to be input to all the processing elements, and the register unit in which the calculation instruction is stored must be connected to all the calculation elements. In contrast, each of the register unit herein is not connected to other processing elements other than the plurality of processing elements of the corresponding row. Accordingly, the hardware design can be facilitated, the degree of integration can be improved, and the scalability of the processor 100 can be improved.

Up to here, the hardware structure of the processor 100 and the scalability according thereto have been described. Below, a method of performing convolution processing using the processor 100 will be described.

FIGS. 3A to 3E are views to illustrate a method for performing a convolution processing according to an exemplary embodiment. The filter data (kernel data) and the target data (image data) are described with an example of FIG. 3A, but this is merely exemplary. The kernel data may be referred to as filter coefficients, filter data, elements or weights. The data to be operated on may be called target data or target data to be processed. A single piece of the target data may be called a target data word.

Figure 3A:
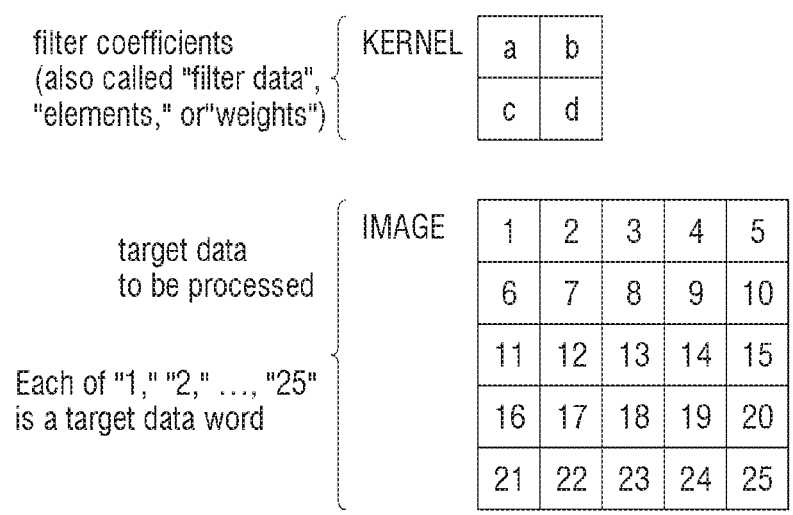
FIGS. 3A to 3E are views to illustrate a method for performing a convolution processing according to an exemplary embodiment.
Figure 3B:
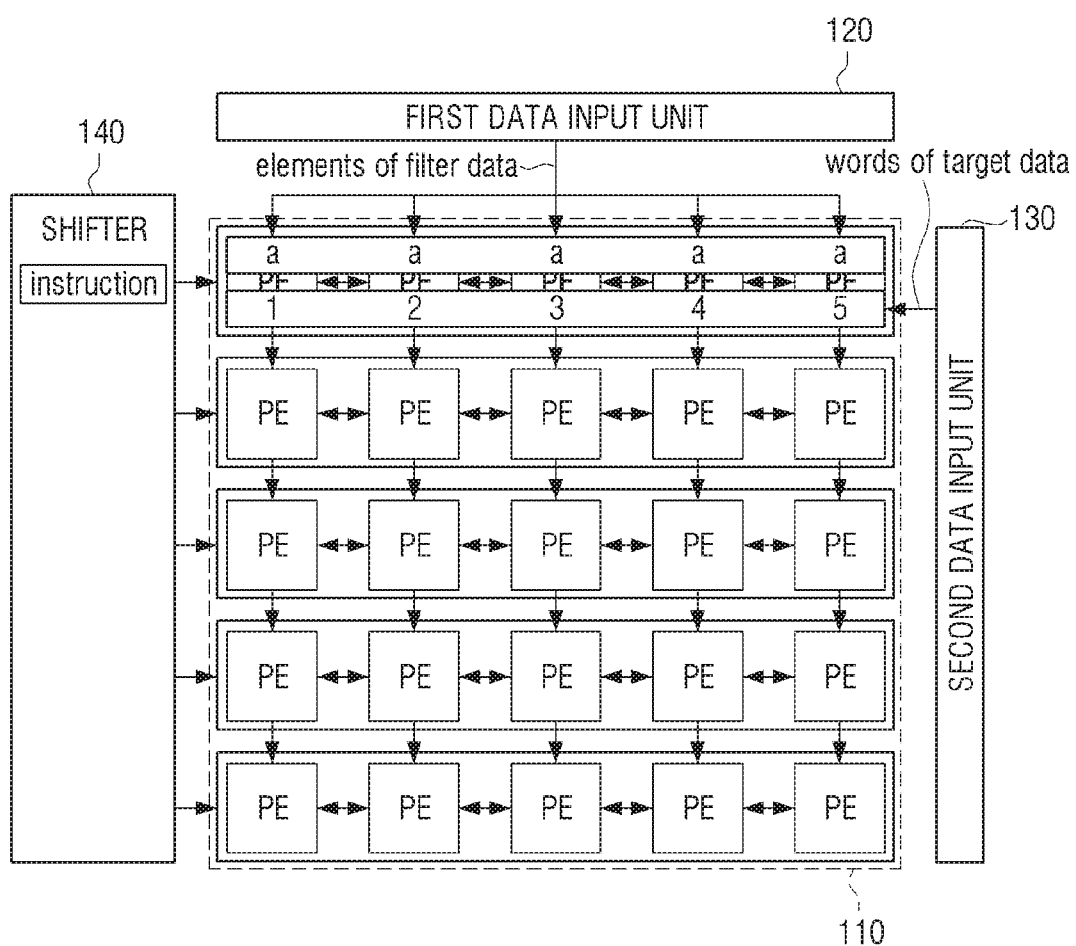

FIG. 3B illustrates an operation of the processor 100 in the first cycle according to an exemplary embodiment. The shifter 140 feeds instructions to the processing elements. The first data input unit 120 feeds elements of filter data to the processing elements. The second data input unit feeds words of target data to the processing elements.

In the first cycle, the processor 100 may control the first data input unit 130 to input the first element (a) from among a plurality of elements included in filter data to each of the plurality of first processing elements 1101 included in the first row of the processing element unit 110, control the second data input unit 130 to input the first data (variable names for the target data in the first row are given as "1," "2," "3," "4," "5") from among the target data to each of the plurality of first processing elements 110-1, and control the processing element unit 110 to process the first element and the first data based on the first processing instruction (Mul) which is input through the shifter 140.

In the first cycle, the processor 100 may input a first processing instruction into each of the plurality of first processing elements 110-1, and control the shifter 140 to shift the first processing instruction from the first register unit which corresponds to the first row to the second register unit which corresponds to the second row.

Figure 3C:
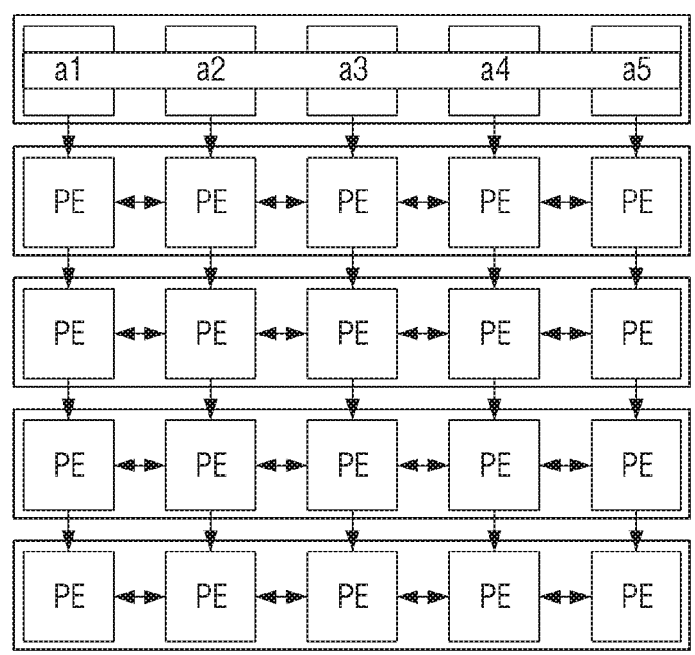
Figure 3D:
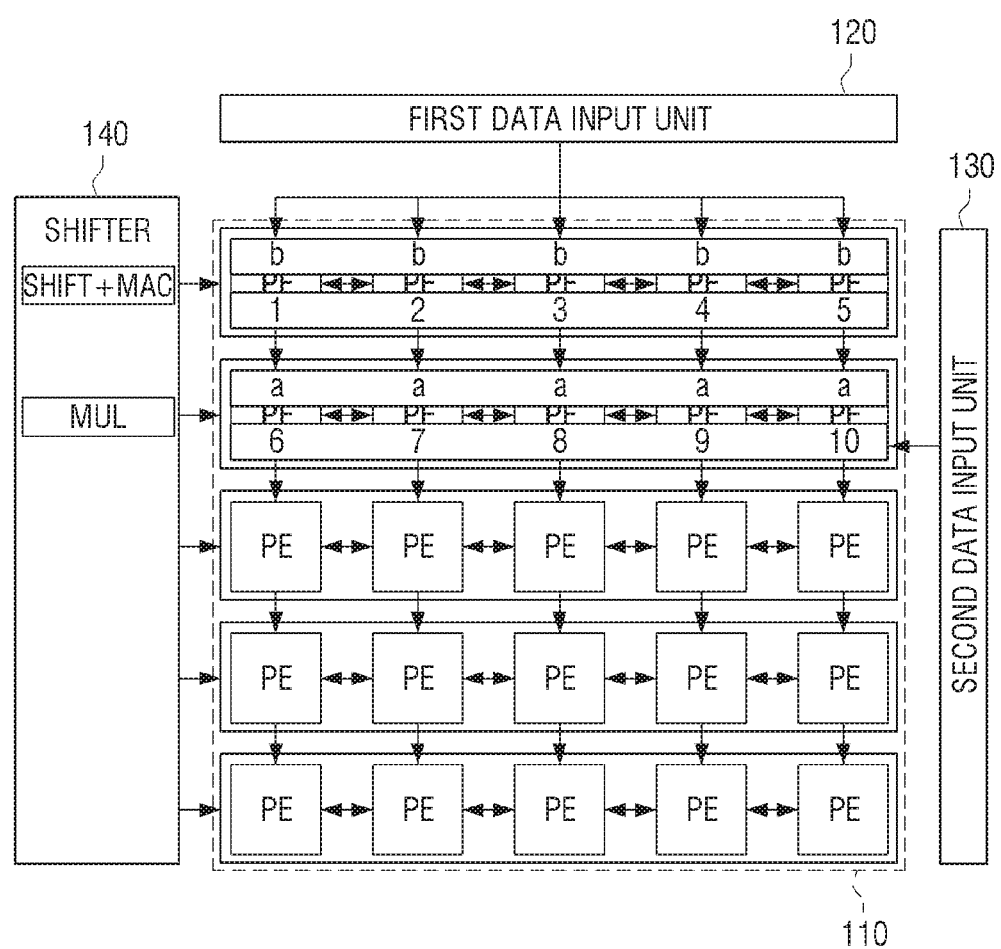

The processing result is as shown in FIG. 3C. In the first cycle, each of the plurality of first processing elements 110-1 may store the first element, the first data, and the processing result. Examples of processing results after the first cycle are the products a1, a2, a3, a4, and a5.

The processor 100 may input the second processing instruction (Shift+MAC) to each of the plurality of first processing elements 110-1 in the second cycle following the first cycle, and control the shifter 140 to shift the second processing instruction from the first register unit to the second register unit.

According to the shift instruction, each of the plurality of first processing elements 110-1 can shift the processing result processed in the first cycle to adjacent processing elements. In particular, the shift instruction may be an instruction to shift the processing data according to the processing result to the adjacent processing element in the right side. That is, the processor 100 may control the processing element unit 110 to transfer the processing data of the first element and the first data to the adjacent processing elements.

Figure 3E:
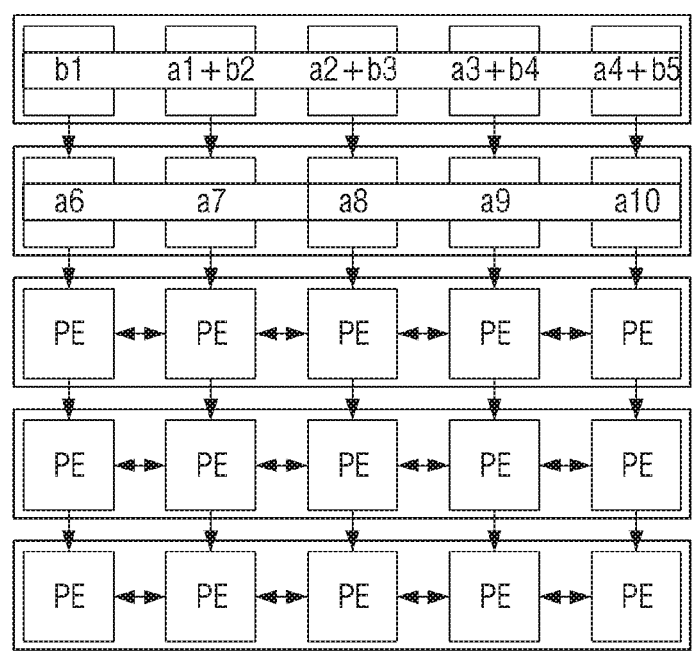

The processor 100 may control the processing element unit 110 to shift the first element to each of the plurality of second processing elements 110-2 included in the second row of processing element unit 110 in the second cycle, control the first data input unit 120 to input the second element b among the plurality of elements included in the filter data to each of the plurality of first processing elements 110-1, and control the processing element unit 110 to process the second element and the first data based on the second processing instruction (Shift+MAC) inputted through the shifter 140. Here, the plurality of first processing elements 110-1 can store the first data even if the cycle is changed. As shown in FIG. 3E, after the shift the product a1 now appears in the second column of the first row.

That is, according to the MAC command, each of the plurality of first processing elements 110-1 process the second element (b) input from the first data input unit 120 in the second cycle and the first target data (1, 2, 3, 4, 5) input from the second data input unit 130 in the first cycle, and accumulate the processing data transferred from the adjacent processing element with the data processed from each of the plurality of first processing elements 110-1. As shown in FIG. 3E, a result after the second cycle in the first processing element of the first row is the product b1, while a result after the second cycle in the second processing element of the first row is the sum of products a1+b2.

The processor 100 may input the first processing instruction (mul) which is shifted from the first cycle to each of the second processing elements 110-2 in the second cycle, and control the shifter 140 to shift the first processing instruction from the second register unit to the third register unit which corresponds to the third row of the processing element unit 110.

The processor 100 may, in the second cycle, control the second data input unit 130 to input the second target data (6, 7, 8, 9, 10) from among the target data to each of the plurality of second processing elements 110-2 and control the processing element unit 110 to process the first element (a) and the second data shifted from the first row based on the first processing instruction which is input through the shifter 140. In some embodiments, the first processing instruction reaches the second register unit of the shifter from the first register unit. In order to avoid race conditions, in some embodiments, register clock intervals are provided between the second and third cycles so that the first processing instruction can be input to the second processing elements 110-2 and shift the second processing instruction (Shift+MAC) to the second register unit of the shifter.

The processing result is as shown in FIG. 3E. Each of the plurality of first processing elements 110-1 in the second cycle may store the second element b, the first target data (1, 2, 3, 4, 5) and the processing result, and each of the elements 110-2 may store the first element (a), the second target data (6, 7, 8, 9, 10) and the processing result (in general, the processing result is a sum of products at each processing element).

In the second cycle, processing elements which are two times more numerous than in the first cycle can perform processing since filter data has reached the second row. However, the amount of data to be input to the processing element unit 110 may be the same even if the cycles are changed and thus, the amount of data input from the external memory to the processor 100 can be maintained to be constant. That is, the processor 100 does not receive the target data at a time but sequentially receives a part of the target data, so that even if the data path between the processor 100 and the external memory is reduced, there is no problem in data transfer.

In the third cycle following the second cycle, the processor 100 may control the processing element unit 110 to shift the first element filter (a) to each of the plurality of third processing elements 110-3 included in the third row of the processing element unit 110 and shift the second element (b) to each of the plurality of second processing elements 110-2, and control the first data input unit 120 to input the fourth element (d) from among a plurality of elements included in the filter data to each of the plurality of first processing elements 110-1.

Here, the processor 100 controls the first data input unit 120 to input the fourth element (d), since the filter data is in a two dimensional form. Specifically, inputting the third element (c) may require one more shift than inputting the fourth element (d) and thus, the processor 100 may input the fourth element (d) before the third element (c) for efficient processing.

In the third cycle, the processor 100 may input the first processing instruction (mul) shifted in the second cycle to each of the plurality of third processing elements 110-3, and control the shifter 140 to shift the first processing instruction from the third register unit to the fourth register unit which corresponds to the fourth row of the processing element unit 110. Further, in the third cycle, the processor 100, in the third cycle, may input the second processing instruction (Shift+MAC) shifted from the second cycle to each of the plurality of second processing elements 110-2 and control the shifter 140 to shift the second processing instruction from the second register unit to the third register unit.

In the third cycle, the processor 100 may control the second data input unit 130 to input the third target data (11, 12, 13, 14, 15) from among the target data to each of the plurality of third processing elements 110-3, process the first element (a) and the third data shifted from the second row based on the first processing instruction which is inputted through the shifter 140, and control the processing element unit 110 to process the first element (b) and the second data shifted from the first row based on the second processing instruction which is inputted through the shifter 140.

The processing results of the plurality of first processing elements 110-1 processed in the second cycle can be shifted to the plurality of second processing elements 110-2. At this time, the shifted processing result and the processing result of the plurality of second processing elements 110-2 processed in the third cycle can be stored separately from each other in the plurality of second processing elements 110-2. Thereafter, the processing result of the plurality of second processing elements 110-2 processed in the third cycle may be shifted to the third processing element 110-3 in the fourth cycle after the third cycle.

The processor 100 may control the processing element unit 110 to shift the first element (a), the second element (b), and the fourth element (d) in a fourth cycle, in a similar manner to the previous cycle, and control the first data input unit 120 to input the third element (c) among the plurality of elements included in the filter data to each of the plurality of first processing elements 110-1.

In addition, the processor 100 may input the processing instructions inside the shifter 140 to the plurality of processing elements in the corresponding row and control the shifter 140 to perform shifting in the same manner as the previous cycle.

For convenience of description, only a plurality of second processing elements 110-2 will be described below. In the plurality of second processing elements 110-2, the processing result of the plurality of first processing elements 110-1 which are processed in the second cycle and the processing result of the plurality of second processing elements 110-2 which are processed in the third cycle are stored, and the processor 100 may control the processing element 110 to shift the processing result of the plurality of second processing elements 110-2 which are processed in the third cycle to the plurality of third processing elements 110-3.

The processor 100 may process the fourth element (d) and the second target data (6, 7, 8, 9, 10) shifted from the plurality of first processing elements 110-1 and accumulate the processed result with the processed result of the plurality of first processing elements 110-1.

For example, the intermediate convolution result (sum of products) a1+b2+d7 can be generated as a processing result through the above processing, taking the upper left end of the target data and the first data processed from the filter data as an example. The processing result of a1+b2+d7 can be generated by the second processing element from the left among the plurality of second processing elements 110-2.

The fifth cycle is similar to the second cycle, but the shift direction according to the shift instruction may be left rather than right. For example, a1+b2+d7+c6 can be generated as a result of the above processing by taking the upper left part of the target data and the first data calculated from the filter data as an example. The processing result of a1+b2+d7+c6 can be generated by the first processing element from the left of the plurality of second processing elements 110-2.

Through the above process, the convolution processing of the processor 100 is performed.

Figure 4:
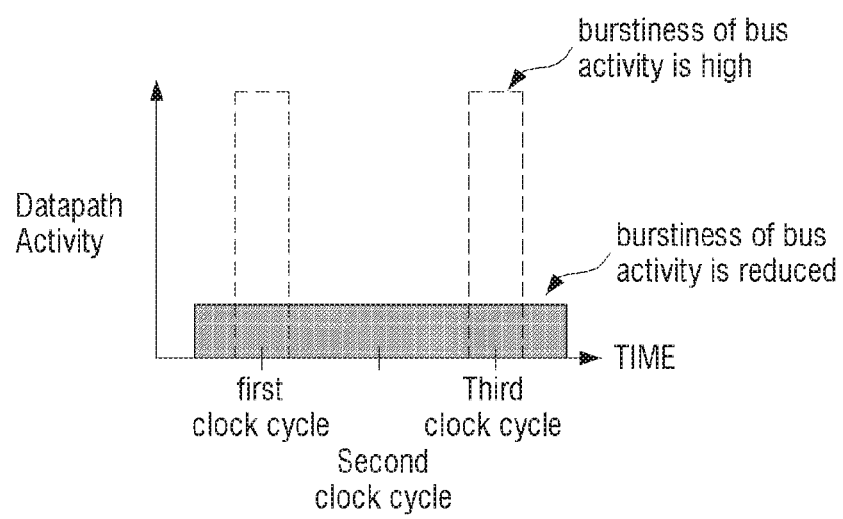
FIG. 4 is a view to illustrate data transfer amount from an external memory to a processor according to an exemplary embodiment.

FIG. 4 is a view to illustrate data transfer amount from an external memory to a processor according to an exemplary embodiment.

Figure 1C:
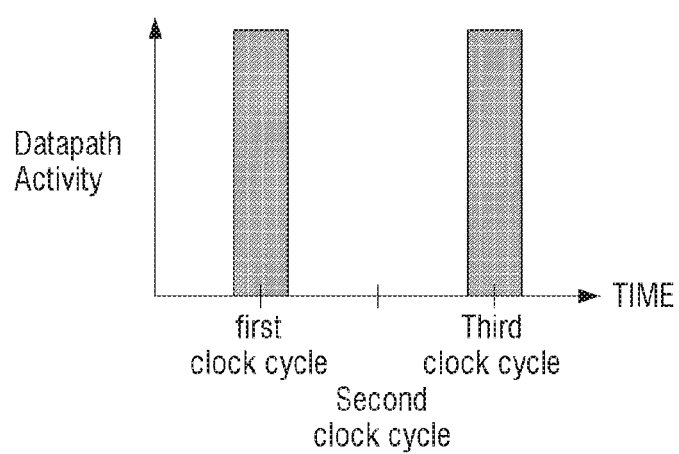
Figure 1D:
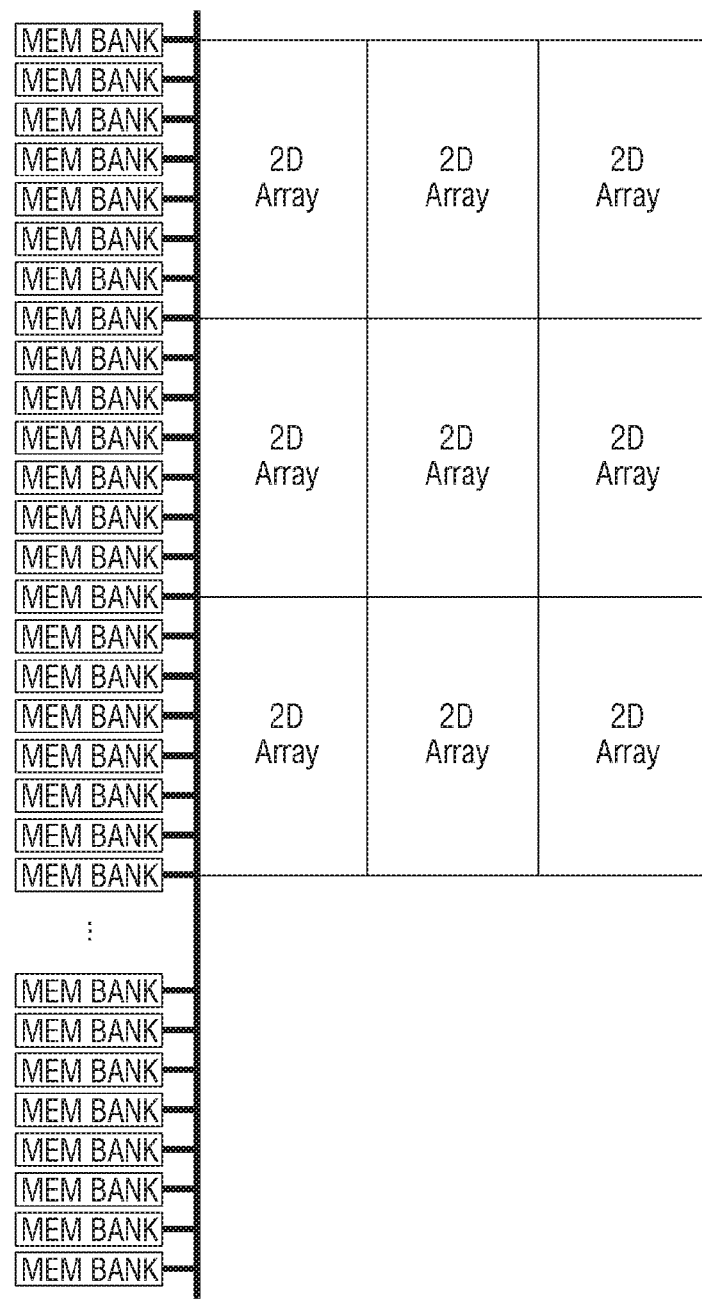

As illustrated in FIG. 4, the solid line portion indicates data transfer amount by the processor 100 ("burstiness of bus activity is low") and the dotted line portion ("burstiness of bus activity is high") indicates data transfer amount by the related-art processor as illustrated in FIG. 1C.

That is, the processor 100 sequentially performs processing, and accordingly, the amount of data transfer from the external memory to the processor 100 can be kept constant. In this case, the data transfer amount using the processor 100 of the present disclosure may be smaller than the instantaneous data transfer amount using the related art processor. Accordingly, the processor 100 of the present disclosure may not have an obstruction in processing even if data path with the external memory is smaller than the related art processor.

Figure 5:
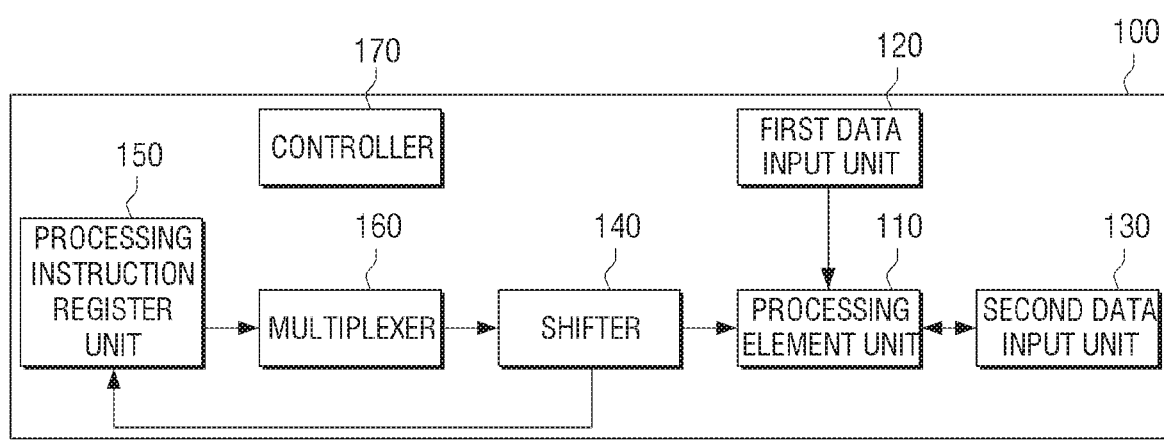
FIG. 5 is a block diagram illustrating a detailed configuration of a processor for performing deep learning according to an exemplary embodiment.

FIG. 5 is a block diagram illustrating a detailed configuration of a processor for performing deep learning according to an exemplary embodiment. According to FIG. 5, the processor 100 includes the processing element unit 110, the first data input unit 120, the second data input unit 130, the shifter 140, the processing instruction register unit 150, and the multiplexer 160. The processing instruction register unit 150, in some embodiments, is realized as a register file. The detailed description of the components shown in FIG. 5 will be omitted for the parts overlapping the components shown in FIG. 2A.

The processing instruction register unit 150 can store a plurality of processing instruction sets. Here, each of the plurality of processing instruction sets may include a plurality of processing instructions to be input to each of the plurality of rows of the processing element unit 110. That is, each of the plurality of processing instruction sets may include as many processing instructions as the number of rows of the processing element unit 110.

The processor 100 may provide a plurality of sets of processing instructions to the multiplexer 160 and control the processing instruction register unit 150 to receive and store a set of processing instructions from the shifter 140.

The multiplexer 160 may be connected between the processing instruction register unit 150 and the shifter 140.

The processor 100 may control the multiplexer 160 to provide one of a plurality of processing instruction sets stored in the processing instruction register unit 150 to the shifter 140.

FIGS. 6A to 6D are views to describe a pooling operation according to an exemplary embodiment. The pooling operation may operate through the processor 100 structure of FIG. 5. In the pooling operation, it is important to alternately input two processing instruction sets and shift processing instruction sets. In FIGS. 6A to 6D, the first data input unit 120 and the second data input 130 for input of the filter (kernel) data and the target data are omitted.

First of all, in the processing instruction register unit 150 before starting the pooling operation, there may be a plurality of processing instruction sets stored therein.

Figure 6A:
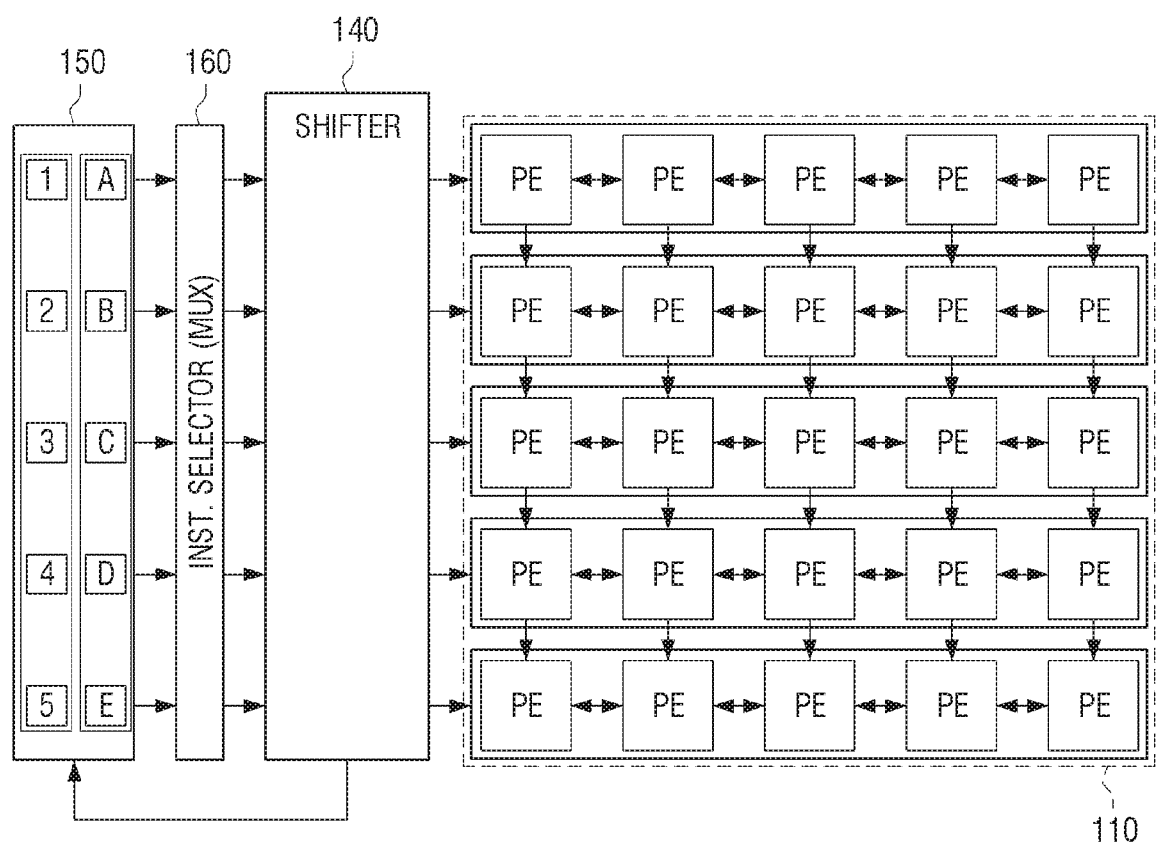
FIGS. 6A to 6D are views to describe a pooling operation according to an exemplary embodiment.

For example, as shown in FIG. 6A, the first processing instruction set and the second processing instruction set may be stored in the processing instruction register unit 150 before the pooling operation is started.

The processor 100 may control the multiplexer 160 to provide one of the plurality of processing instruction sets stored in the processing instruction register unit 150 to the shifter 140.

Figure 6B:
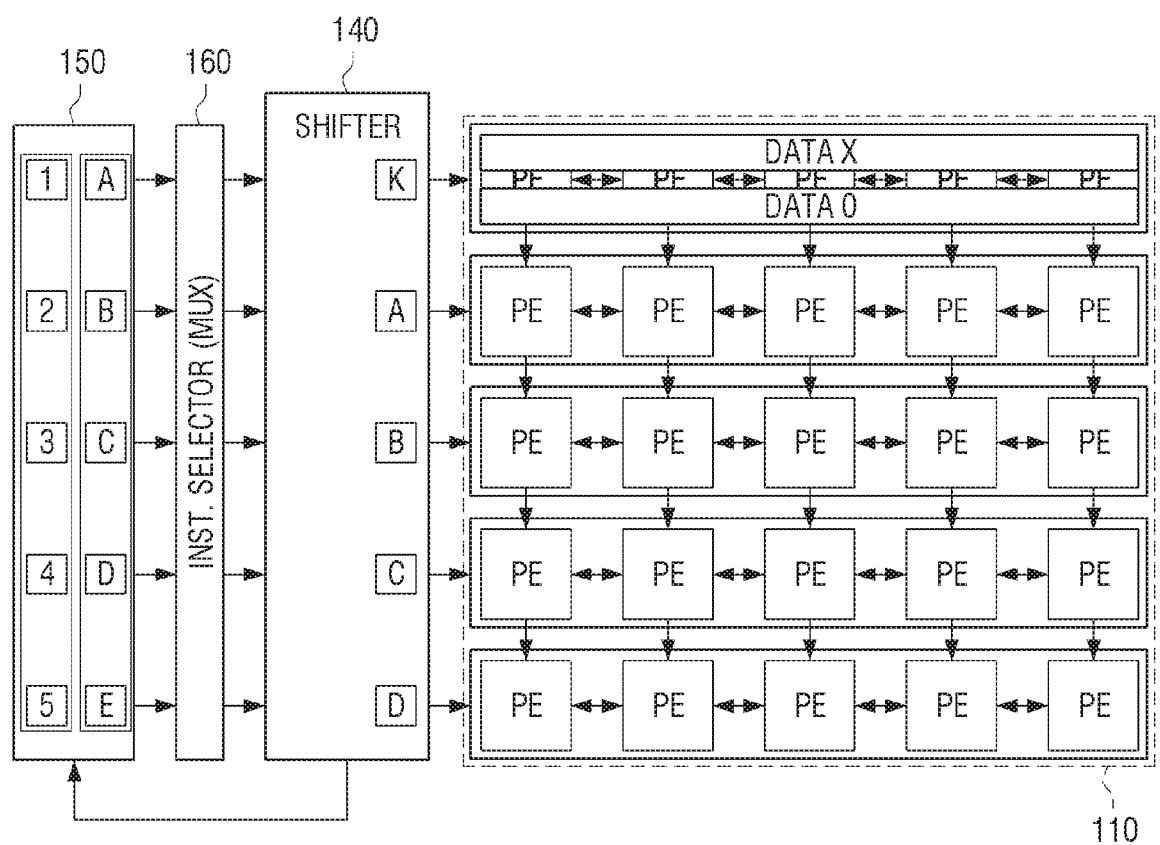

For example, as shown in FIG. 6B, the processor 100 may control the multiplexer 160 to provide one of the first processing instruction set (1, 2, 3, 4, 5) and the second processing instruction set (A, B, C, D, E) stored in the processing instruction register unit 150 to the shifter 140. The identifiers are to be understood in context. Earlier, (1, 2, 3, 4, 5) denoted variable names for target data. In the discussion below, (1, 2, 3, 4, 5) refers to an instruction set including instructions "1," "2." "3," "4," and "5."

The processor 100 may store a set of processing instructions which are input to the shifter 140 in a plurality of register units and shift each of the instructions included in the stored processing instruction set into adjacent register units in a predetermined direction. The processor 100 may input an additional processing instruction into the first register unit corresponding to the first row, and control the shifter 140 to input each of the additional processing instruction and the instruction included in the shifted processing instruction set to each of the corresponding row of the processing element unit 110.

For example, the processor 100 may store the second set of processing instructions (A, B, C, D, E) input to the shifter 140 in a plurality of register units, shift each of the instructions included in the stored processing instruction set to an adjacent register unit in a preset direction, input an additional processing instruction (K) to the first register unit corresponding to the first row, and control the shifter 140 to input the additional processing instruction (K) and each of the instructions included in the shifted processing instruction set to each of the rows corresponding to the processing element unit 110.

Here, the processing instruction (E) stored in the last register unit does not have a register unit for shift and the processor 100 may delete the processing instruction (E) stored in the last register unit.

The present embodiment is not limited thereto, and the processor 100 may input the processing instruction (E) stored in the last register unit instead of the additional processing instruction K.

After that, the processor 100 may control the shifter 140 to provide the instruction included in the additional processing instruction and the shifted instruction set to the processing instruction register unit 150, and control the processing instruction register unit 150 to update the processing instruction set which is input to the shifter 140, from among the first processing instruction set and the second processing instruction set stored in the processing instruction register unit 150, to the additional processing instruction and the instruction included in the shifted processing instruction set.

At the same time, the processor 100 may control the multiplexer 160 to provide another instruction set from among the plurality of processing instruction set stored in the processing instruction register unit 150 to the shifter 140.

Figure 6C:
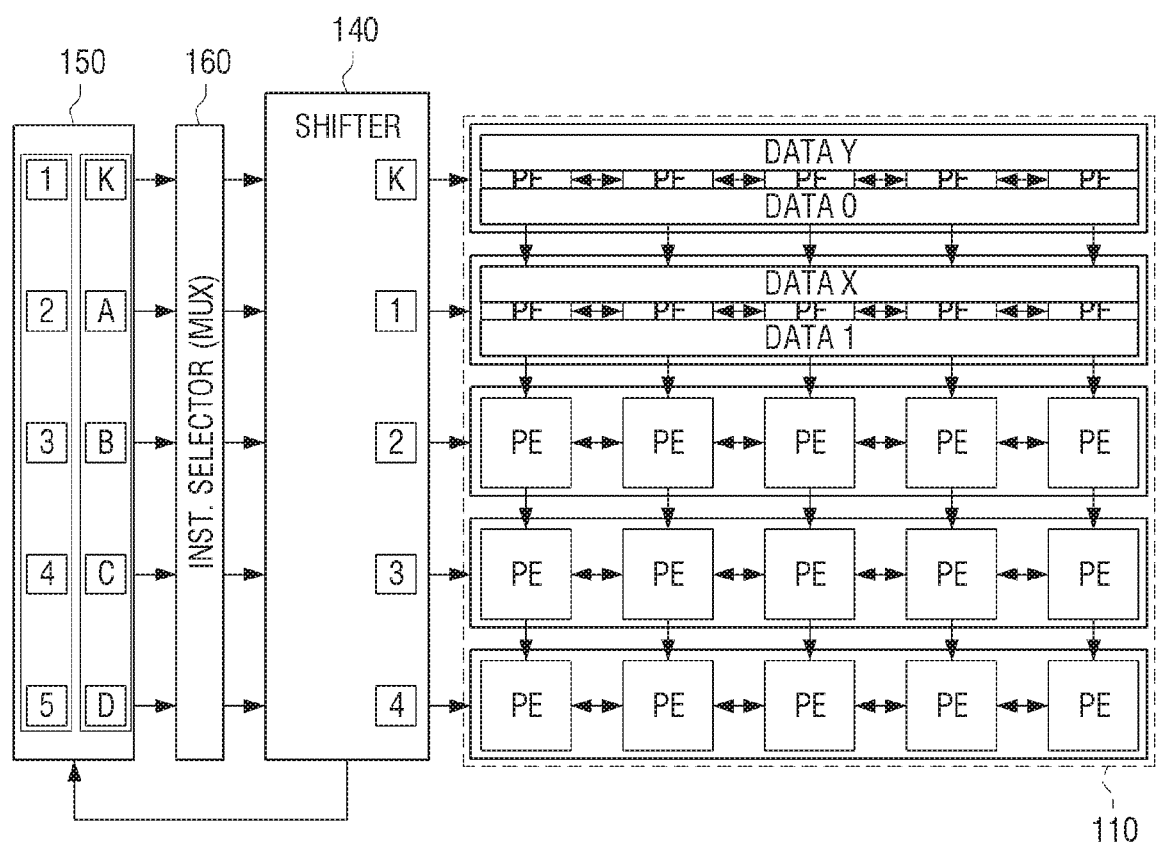

That is, as illustrated in FIG. 6C, the processor 100 may update the second processing instruction set (A, B, C, D, E) of the processing instruction register unit 150 to K, A, B, C, D. The processor 100 may control the multiplexer 160 to provide the first processing instruction set (1, 2, 3, 4, 5) stored in the processing instruction register unit 150 to the shifter 140.

The operations thereafter are the same when the second processing instruction (A, B, C, D, E) is input.

The processor 100 may store the first processing instruction set (1, 2, 3, 4, 5) which is input to the shifter 140 in the plurality of register units, shift each instruction included in the stored processing instruction set to an adjacent register unit in a predetermined direction, input the additional processing instruction (K) to the first register unit corresponding to the first row, and control the shifter 140 to input each of the additional processing instruction (K) and the instructions included in the shifted processing instruction set to each row corresponding to the processing element unit 110.

Similarly, since there is no register unit for shift in the processing instruction 5 stored in the last register unit, the processor 100 can delete the processing instruction 5 stored in the last register unit.

Alternatively, the processor 100 may input the processing instruction 5 which is stored in the last register unit, instead of the additional processing instruction K.

Figure 6D:
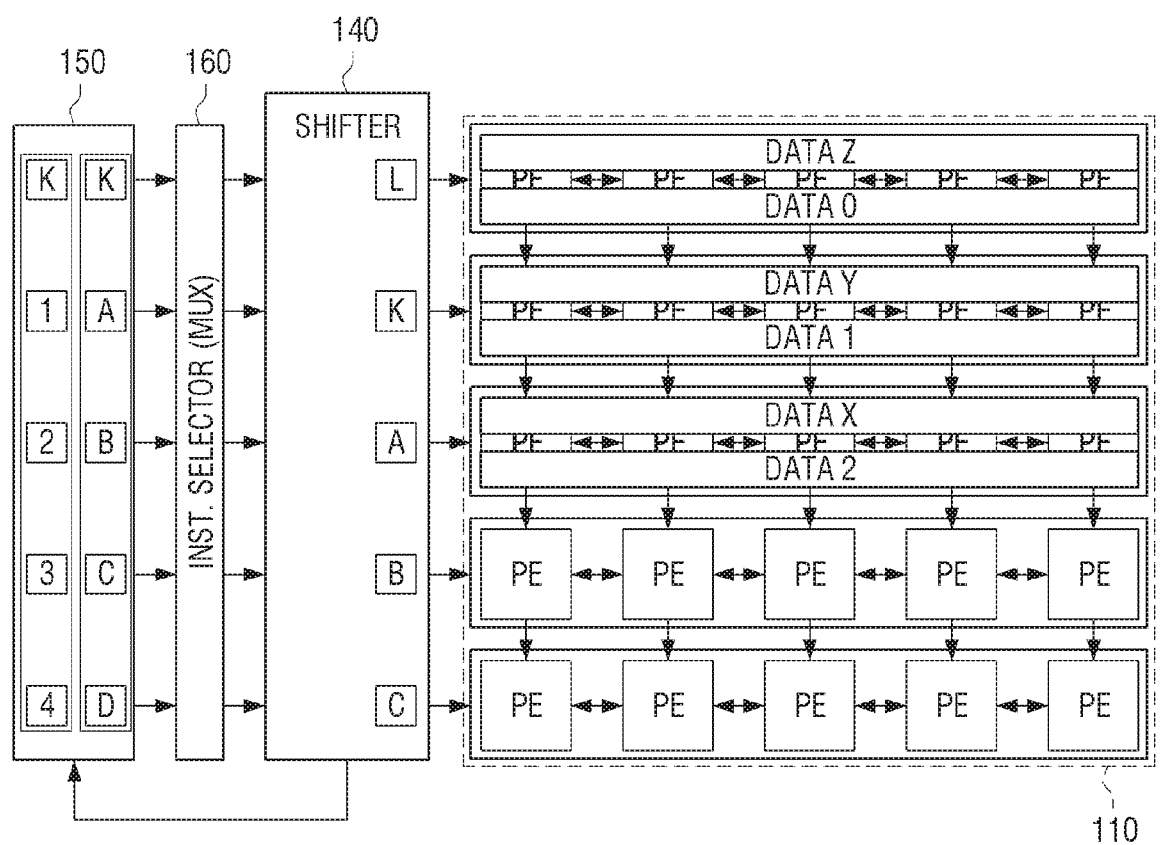

As illustrated in FIG. 6D, the processor 100 may update the first processing instruction set (1, 2, 3, 4, 5) of the processing instruction register unit 150 to K, 1, 2, 3, 4. The processor 100 may control the multiplexer 160 to provide the second processing instruction set (K, A, B, C, D) stored in the processing instruction register unit 150 to the shifter 140.

The processor 100 may perform the pooling operation by repeating the above operation. At this time, the operation of the processing element unit 110, the first data input unit 120, and the second data input unit 130 may be the same as in the case of convolution.

For example, the first data input unit 120 inputs the filter data to the plurality of first processing elements 110-1, and the input data can be shifted to the plurality of processing elements included in the next row as the cycle is changed. The second data input unit 130 can sequentially input a part of the target data according to a cycle from the plurality of first processing elements 110-1 to the plurality of fifth processing elements 110-5. The processing element unit 110 processes the input data based on the input processing instruction and can shift the filter data on a cycle-by-cycle basis.

Figure 7:
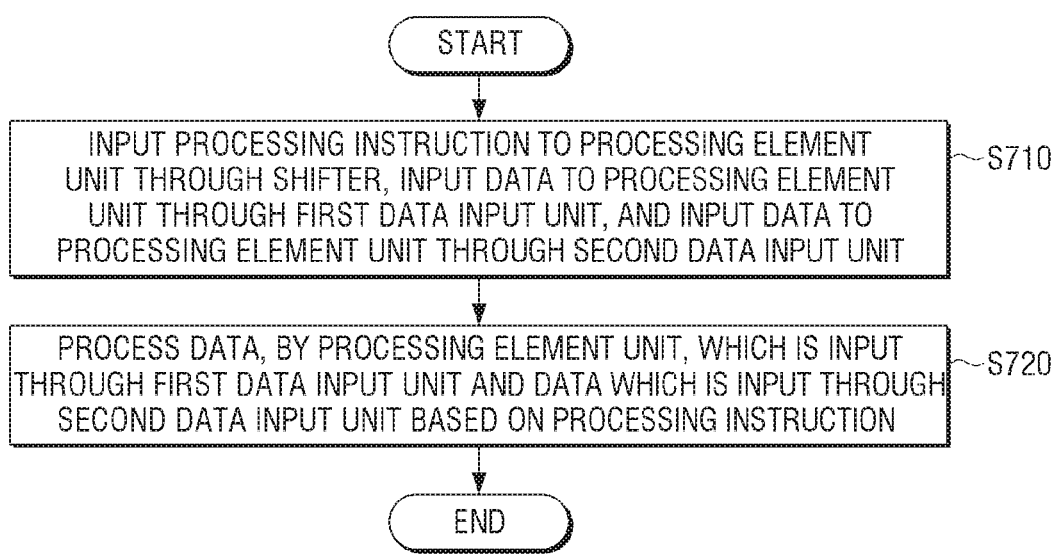
FIG. 7 is a flowchart to describe a control method of a processor according to an example embodiment.

FIG. 7 is a flowchart to describe a control method of a processor according to an example embodiment A control method of a processor for performing deep learning includes first inputting a processing instruction through a shifter to a processing element unit, inputting data to the processing element unit through the first data input unit, and inputting data to the processing element unit through the second data input unit (S710). Then, the processing element unit processes the data inputted through the first data input unit and the data inputted through the second data input unit based on the processing instruction (S720). The processor includes a processing element unit including a plurality of processing elements arranged in a matrix form, a first data input unit which is connected to each of the plurality of first processing elements included in the first row of the processing element unit, a second data input unit connected to each of the plurality of processing elements of the processing element unit and a plurality of register units corresponding to each of the plurality of rows of the processing element unit, and each of the plurality of register units may include a shifter which is connected to a plurality of processing elements included in rows of the corresponding processing element units.

Here, the processing step (S720) may include inputting a first element among the plurality of elements included in the filter in each of the plurality of first processing elements through the first data input unit in the first cycle, inputting first data from among target data to each of a plurality of first processing elements through the second data input unit, and processing the first element and the first data based on a first processing instruction that is input through the shifter.

In addition, the processing step (S720) may further include shifting the first element into each of the plurality of second processing elements included in the second row of the processing element unit in the second cycle following the first cycle, inputting a second element out of the plurality of elements included in the filter to each of the plurality of first processing elements through the first data input unit and processing by the processing element unit the second element and the first data based on the second processing instruction which is input through the shifter.

Alternatively, the processing (S720) may further include shifting the first element to each of the plurality of second processing elements included in the second row of the processing element unit in the second cycle following the first cycle and processing the first element and the second data shifted from the first row based on the first processing instruction which is input through the shifter.

Herein, the processing (S720) may further include inputting the first processing instruction to each of the plurality of first processing elements and shifting the first processing instruction from the first register unit corresponding to the first row to the second register unit corresponding to the second row in the first cycle, and in the second cycle, inputting the shifted first processing instruction to each of the plurality of second processing elements, inputting the second processing instruction to each of the plurality of first processing elements, shifting the first processing instruction from the second register unit to the third register unit corresponding to the third row of the processing element unit, and shifting the second processing instruction from the first register unit to the second register unit.

In the meantime, the processing (S720) may further include transferring data which processes the first element and the first data to an adjacent element and accumulating the transferred processing data with the data processed in the processing element.

The second data input unit may be connected to the external memory through the data paths in the same number as the plurality of processing elements included in the row of the processing element unit.

In addition, the processor further includes the processing instruction register unit and a multiplexer connected between the processing instruction register unit and the shifter, and the control method includes providing one of the plurality of processing instruction sets stored in the processing instruction register unit by the multiplexer to the shifter, and each of the plurality of processing instruction sets may include a plurality of processing instructions to be input to each of a plurality of rows of arithmetic processing element units.

Herein, storing the processing instruction set which is input to the shifter in a plurality of register units, shifting each of the instructions included in the stored processing instruction set to an adjacent register unit in a predetermined direction, and inputting an additional processing instruction to the first register unit corresponding to the first row are further included. In inputting to the processing element unit (S710), each of the instructions included in the additional processing instruction and instructions included in the shifted processing instruction set can be input to each of the rows corresponding to the processing element unit.

Providing an additional processing instruction and an instruction included in the shifted processing instruction set to the processing instruction register unit and updating the processing instruction set which is input to the shifter from among the plurality of processing instruction set included in the processing instruction register unit to an additional processing instruction and an instruction included in the shifted processing instruction set can be further included.

According to various embodiments of the present disclosure as described above, the processor is designed to reduce the amount of peak data transfer from the external memory, and performs processing corresponding to the designed structure, thereby improving scalability of a processor.

The foregoing example embodiments and advantages are merely examples and are not to be construed as limiting. The present teaching can be readily applied to other types of apparatuses. Also, the description of the example embodiments is intended to be illustrative, and not to limit the scope of the claims, and many alternatives, modifications, and variations will be apparent to those skilled in the art.

What is claimed is:

1. A processor for performing deep learning, the processor comprising:
    a controller;
    a processing element array including a plurality of processing elements, wherein: i) the plurality of processing elements comprise first processing elements, ii) the plurality of processing elements are arranged in a matrix of a number of rows and a number of columns, iii) a first row of the processing element array includes the first processing elements, iv) a second row of the processing element array includes second processing elements, and v) each of the first processing elements is followed by corresponding second processing element from among the second processing elements;
    a first data input interface only connected to each processing element of the first processing elements, wherein the first data input interface is configured to input filter data to the first processing elements;
    a second data input interface connected to each processing element of the processing element array, wherein the second data input interface is configured to input target data to the processing element array; and
    a shifter including a plurality of registers, wherein: i) a first register of the plurality of registers is connected to the first row, ii) a second register of the plurality of registers is connected to the second row, and iii) the shifter is configured to input a plurality of processing instructions to the processing element array, wherein the plurality of processing instructions includes a first processing instruction,
    wherein the target data and the plurality of processing instructions are independently inputted into the processing element array, and
    wherein the second data input interface inputs target data into only one row of the processing element array per processing cycle and shifts an input row every processing cycle.

2. The processor of claim 1, wherein, for a first cycle, the controller is configured to:
    control the first data input interface to input a first element of the filter data to each of the first processing elements,
    control the second data input interface to:
        input a first target word of the target data to a first processing element of the first processing elements, and
        input a second target word of the target data to a second processing element of the first processing elements, and
    control the processing element array to:
        form a first result based on the first element, the first target word, and the first processing instruction, and
        form a second result based on the first element, the second target word, and the first processing instruction.

3. The processor of claim 2, wherein, for a second cycle following the first cycle, the controller is further configured to:
    control the processing element array to shift the first element of the filter data into the second processing elements,
    control the first data input interface to input a second element of the filter data to each of the first processing elements, and
    control the processing element array to process the second element and the target data based on a second processing instruction.

4. The processor of claim 2, wherein, for a second cycle following the first cycle, the controller is further configured to:
    control the processing element array to shift the first element of the filter data second processing elements,
    control the second data input interface to input a third target word of the target data to a first processing element of the second processing elements, and
    control the processing element array to process the first element and the third target word based on the first processing instruction.

5. The processor of claim 4, wherein the controller is further configured to control the shifter, for the first cycle, to:
    input the first processing instruction to the first processing elements, and
    shift the first processing instruction from the first register to the second register; and
control the shifter, for the second cycle, to:
    input the first processing instruction from the second register to each of the second processing elements,
    input a second processing instruction from the first register to each of the first processing elements,
    shift the first processing instruction from the second register to a third register associated with a third row of the processing element array, and
    shift the second processing instruction from the first register to the second register.

6. The processor of claim 2, wherein the controller is further configured to:
control the first processing element of the first processing elements to:
transfer the first result to the second processing element of the first processing elements, wherein the second processing element of the first processing elements is adjacent to the first processing element of the first processing elements, and
control the second processing element to accumulate the first result with other data previously processed in the second processing element.

7. The processor of claim 1, wherein the second data input interface is connectable to an external memory through data paths, wherein a number of the data paths is equal to the number of columns.

8. The processor of claim 1, further comprising:
a processing instruction register file; and
a multiplexer connected between the processing instruction register file and the shifter,
wherein the controller is further configured to control the multiplexer to provide to the shifter a first processing instruction set obtained from the processing instruction register file, and wherein the first processing instruction set includes the first processing instruction.

9. The processor of claim 8, further comprising:
a processing element instruction memory configured to store the first processing instruction set,
wherein the controller is further configured to control the shifter to:
shift the first processing instruction set downward to make room in the first register,
input, from the processing element instruction memory, an additional processing instruction to a position in the processing instruction register file associated with the first row, and
input the additional processing instruction and second additional processing instructions of the first processing instruction set to rows of the processing element array.

10. The processor of claim 9, wherein the controller is further configured to:
control the processing instruction register file to input, from the processing element instruction memory to the processing instruction register file, a second processing instruction set for a pooling operation with respect to the first processing instruction set, and
control the shifter to input the second processing instruction set.

11. The processor of claim 1, wherein, for a first cycle, the controller is configured to:
control the first data input interface to input a first element of the filter data to each of the first processing elements;
control the second data input interface to only input a first set of target words into the first processing elements; and
form first results based on the first elements, the first set of target words, and the first processing instruction;
wherein, for a second cycle, the controller is configured to:
control the first data input interface to only input a second element of the filter data to each of the first processing elements;
control the second data input interface to only input a second set of target words into the second processing elements; and
form second results based on the first elements, the second set of target words, and the first processing instruction.

12. A control method of a processor performing deep learning, wherein the processor includes a controller, a processing element array in a matrix form with a number of rows and a number of columns, a first data input interface, a second data input interface, and a shifter, the method comprising:
inputting a first processing instruction to first processing elements of a first row of the processing element array through the shifter, inputting filter data to only the first processing elements through the first data input interface, and inputting first target data to the first processing elements through the second data input interface, the second data input interface being connected to each processing element of the processing element array; and
processing, by the processing element array, the filter data and the first target data based on the first processing instruction,
wherein target data and the plurality of processing instructions are independently inputted into the processing element array, and
wherein the second data input interface inputs target data into only one row of the processing element array per processing cycle and shifts an input row every processing cycle.

13. The control method of claim 12, wherein the processing, in a first cycle, further comprises:
inputting a first element from the filter data to each of the first processing elements;
inputting the first target data to each of the first processing elements; and
processing by the processing element array the first element and the first target data based on the first processing instruction.

14. The control method of claim 13, wherein the processing, in a second cycle following the first cycle, further comprises:
inputting a second processing instruction to second processing elements of a second row of the processing element array through the shifter;
shifting the first element into the second processing elements included in a second ro of the processing element array;
inputting a second element from the filter data to each of the first processing elements; and
processing the second element and the first target data based on the second processing instruction.

15. The control method of claim 13, wherein the processing, in a second cycle following the first cycle, further comprises:
shifting the first element to second processing elements of a second row of the processing element array;
inputting second target data to each of the second processing elements; and
processing the first element and the second target data based on the first processing instruction.

16. The control method of claim 15, wherein the processing further comprises:
in the first cycle, inputting the first processing instruction to each of the first processing elements and shifting the first processing instruction from a first register corresponding to the first row to a second register corresponding to the second row, and
in the second cycle, inputting the first processing instruction to each of the second processing elements, inputting a second processing instruction to each of the first processing elements, shifting the first processing instruction from the second register to a third register corresponding to a third row of the processing element array, and shifting the second processing instruction from the first register to the second register.

17. The control method of claim 13, wherein the processing further comprises:
    transferring processing data obtained by processing the first element and the first target data to an adjacent processing element; and
    accumulating the transferred processing data with other data previously processed in the adjacent processing element.

18. The control method of claim 12, wherein the second data input interface is connectable to an external memory through data paths, wherein a number of data paths is a number of columns the processing element array.

19. The control method of claim 12, wherein the processor further comprises: i) a processing instruction register file; and ii) a multiplexer connected between the processing instruction register file and the shifter, and wherein the control method further comprises:
    providing one of a plurality of processing instruction sets stored in the processing instruction register file to the shifter, wherein each of the plurality of processing instruction sets includes a plurality of processing instructions to be input to rows of the processing element array.

20. The control method of claim 19, further comprising:
    storing a first processing instruction set in a plurality of registers of the shifter;
    shifting instructions of the first processing instruction set downward to make room for an additional processing instruction;
    inputting the additional processing instruction to a first register corresponding to the first row; and
    inputting the additional processing instruction and the additional processing instructions of the first processing instruction set to rows of the processing element array.

21. The control method of claim 20, further comprising:
    controlling the processing instruction register file to input, from a processing element instruction memory to the processing instruction register file, a second processing instruction set for a pooling operation with respect to the first processing instruction set, and
    controlling the shifter to input the second processing instruction set.

22. The control method of claim 12, wherein the processing, in a first cycle, further comprises:
    inputting a first element from the filter data to each of the first processing elements;
    inputting only a first set of target words into the first processing elements; and
    forming first results based on the first elements, the first set of target words, and the first processing instruction
wherein, the processing, in a second cycle, further comprises:
    inputting a second element from the filter data to each of the first processing elements;
    inputting only a second set of target words into second processing elements of a second row of the processing element array; and
    forming second results based on the first elements, the second set of target words, and the first processing instruction.

* * * * *